Sept. 16, 1924.  1,508,593

E. BROTHERS ET AL

MACHINE FOR USE IN THE LASTING OF BOOTS AND SHOES

Filed Jan. 17, 1920      12 Sheets-Sheet 1

INVENTORS

Sept. 16, 1924.  
E. BROTHERS ET AL  
MACHINE FOR USE IN THE LASTING OF BOOTS AND SHOES  
Filed Jan. 17, 1920   12 Sheets-Sheet 6

1,508,593

INVENTORS

Sept. 16, 1924.  
E. BROTHERS ET AL  
1,508,593  
MACHINE FOR USE IN THE LASTING OF BOOTS AND SHOES  
Filed Jan. 17, 1920     12 Sheets-Sheet 7

INVENTORS  
Eli Brothers  
William E. Scarlett  
By their Attorney,  
Nelson W. Howard

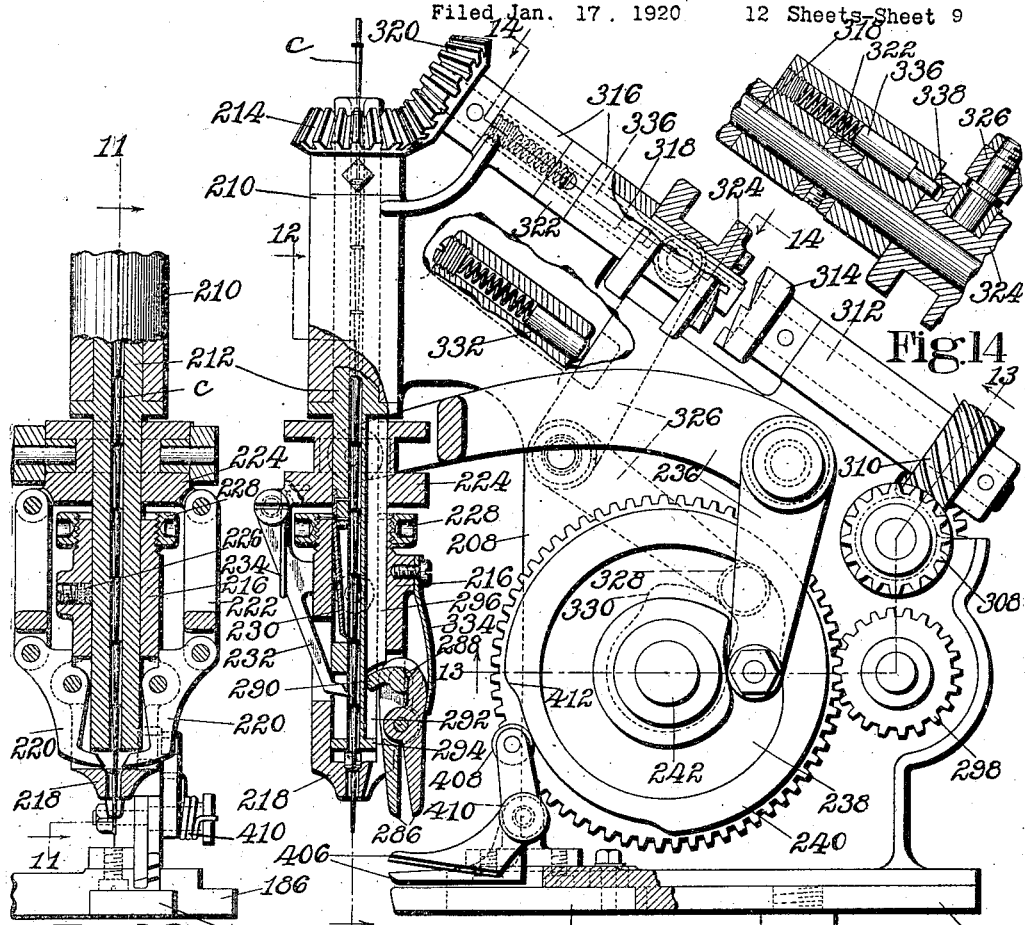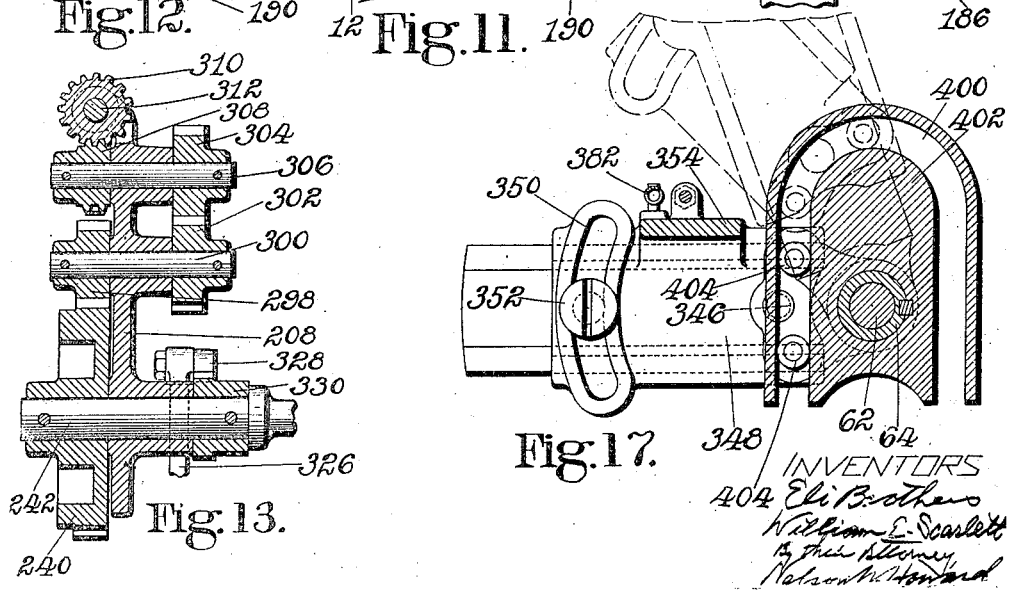

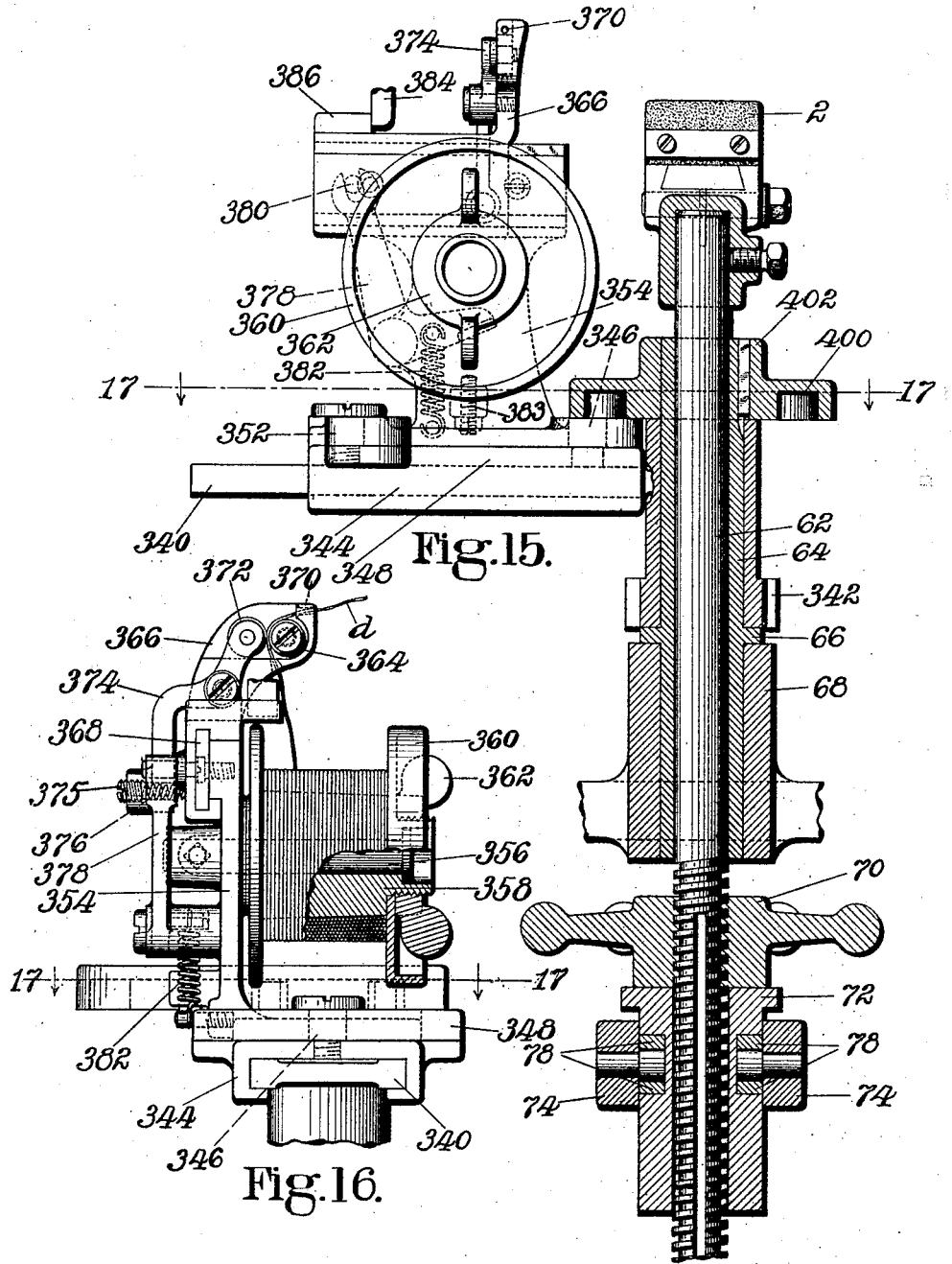

Sept. 16, 1924.  
E. BROTHERS ET AL  
MACHINE FOR USE IN THE LASTING OF BOOTS AND SHOES  
Filed Jan. 17, 1920    12 Sheets-Sheet 11

1,508,593

INVENTORS  
Eli Brothers  
William E Scarlett  
By their Attorney  
Nelson W Howard Sept. 16, 1924.  
E. BROTHERS ET AL  
1,508,593  
MACHINE FOR USE IN THE LASTING OF BOOTS AND SHOES  
Filed Jan. 17, 1920   12 Sheets-Sheet 12

INVENTORS  
Eli Brothers  
William E. Scarlett  
By their Attorney  
Nelson W. Howard Patented Sept. 16, 1924.

1,508,593

UNITED STATES PATENT OFFICE.

ELI BROTHERS AND WILLIAM E. SCARLETT, OF LYNN, MASSACHUSETTS, ASSIGNORS TO UNITED SHOE MACHINERY CORPORATION, OF PATERSON, NEW JERSEY, A CORPORATION OF NEW JERSEY.

MACHINE FOR USE IN THE LASTING OF BOOTS AND SHOES.

Application filed January 17, 1920. Serial No. 352,195.

*To all whom it may concern:*

Be it known that we, ELI BROTHERS and WILLIAM E. SCARLETT, citizens of the United States, residing at Lynn, in the county of Essex and State of Massachusetts, have invented certain Improvements in Machines for Use in the Lasting of Boots and Shoes, of which the following description, in connection with the accompanying drawings, is a specification, like reference characters on the drawings indicating like parts in the several figures.

This invention relates to machines for use in the manufacture of boots and shoes, and is herein shown as embodied in a machine of novel organization provided with means for working an upper into lasted position round the end of a shoe and with means for applying and fastening a binder to the shoe to hold the upper. It will be understood, however, that in many of its aspects the invention is not limited to machines of the particular type illustrated, but is more generally applicable to various types of construction.

Important features of the invention are to be recognized in a novel combination of binder applying and fastening means, the construction shown comprising means whereby a binder is drawn progressively round the end of a shoe from one side to the other and is fastened at the opposite sides successively. More particularly, the illustrative construction comprises a binder applying device which is moved progressively round the end of a shoe to draw a binder into place, and devices which are moved successively into position at the opposite sides of the shoe, and are operated to fasten the binder first at one side and then at the other. In the machine shown the different instrumentalities are power-driven and are automatically controlled to apply a binder and fasten it without attention on the part of the operator, the binder applying and fastening operations following automatically the operation of other means whereby the upper is worked into lasted position round the end of the shoe.

Further features of the invention reside in novel binder applying means. One of these features consists in novel means of control for a binder applying device to determine its relation to the work during the binder applying operation. An object of this part of the invention is to avoid objectionable rubbing contact, for example, between a binder applying device and a shoe while still maintaining the device in position to direct the binder in proper relation to the edge of the shoe bottom. Another object is to insure such angular relation between the binder applying device and the work as to permit proper feeding of the binder material. In the machine shown the binder applying device supports a coil of binder material and carries it round the end of the shoe, and a further feature of the invention consists in a construction in which a coil of binder material is thus mounted for movement relatively to the work. Co-operating with such device in the illustrative construction is means associated with one of the fastening devices for severing the proper length of material from the coil.

Other features of the invention are to be recognized in a novel fastening device for securing an end of binder material to the work. The construction shown comprises a tacker which partially drives a tack and a gripper which grips an end of binder material and is swung round the partially driven tack to anchor the binder to the tack. The novel features involved in this part of the invention include the provision of means for bending binder material a plurality of times round a tack, a novel gripper and operating means for gripping and bending the material, means whereby the gripper is permitted to move inwardly toward the tack in response to the pull of the binder, and means for supporting the tack laterally as the binder is bent round it. Still other features consist in novel power-driving and controlling means and in details of the gripper and tacker mechanism.

Further important features of the invention, having to do with the operation of working an upper over a form or last, include the provision of novel positioning means for end embracing wipers, the construction shown comprising means whereby the wipers are positioned manually in conformity to the contour of a shoe prior to the power-effected upwiping and overwiping operations. In the illustrative machine the initial positioning of the wipers is effected by means of a turnbuckle in the wiper operating connections. An advantageous characteristic of the illustrative construction is that the wipers are held against retractive movement from the position thus initially determined, to obviate the necessity of conforming them to every shoe of the same size and style, and from such starting position they receive a positive overwiping movement of predetermined extent which is uniform in the operation of the machine on successive shoes The invention also provides novel upper clamping means to increase the effectiveness of the wipers on the upper. The construction shown comprises clamp members which engage the upper along the edges of the wipers and are moved outwardly over the wipers to spread the upper. Novel features involved include, among others, the provision of means for imparting to the clamping device an intial positioning movement with the wipers as the latter are conformed to a shoe as hereinbefore explained, and means for relieving the clamping pressure on the upper prior to the completion of the relative operative movements of the wipers and the form or last.

Still another feature of the invention consists in a novel construction and arrangement of holddown mechanism. The construction shown comprises a holddown which is adapted to engage an insole inside of the sewing rib in close conformity to the rib round the end of the shoe to support the rib against pressure of the wipers as well as to assist in restraining the shoe from lengthwise movement. To facilitate accurate positioning of the holddown it is mounted for movement along the surface of the insole until it arrives in position to support the rib round the end of the shoe. Advantageously the holddown in the illustrative construction receives its positioning movement with the clamping device as the latter is operated to spread the margin of the upper, the holddown also being mounted for advancing movement with the wipers in the operation of conforming the wipers intially to the contour of a shoe.

The above and other features of the invention, including certain details of construction and combinations of parts, will now be described with reference to the accompanying drawings and pointed out in the claims.

Figure 1:
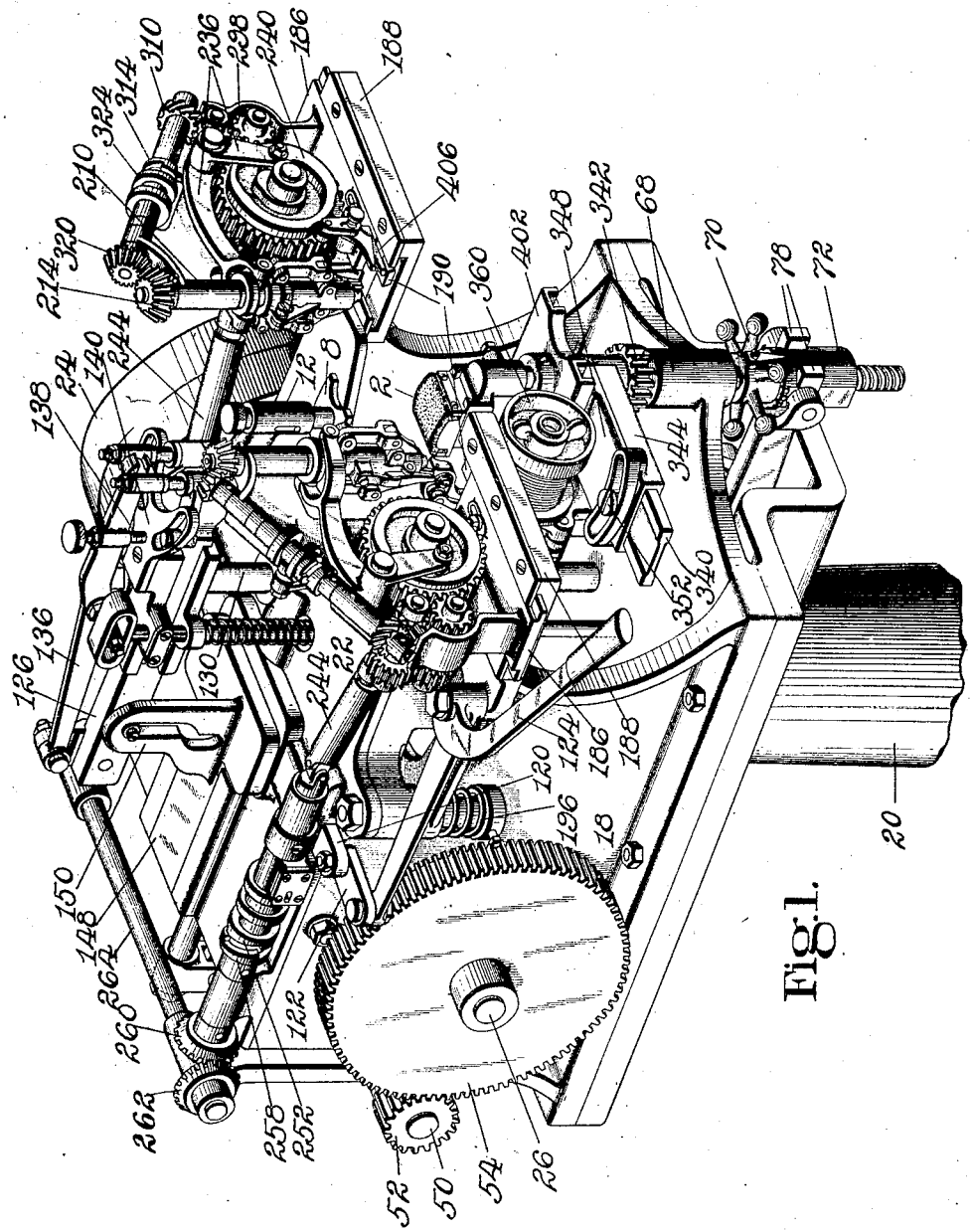
Fig. 1 is a perspective view of the head portion of a machine in which the invention is embodied.
Figure 2:
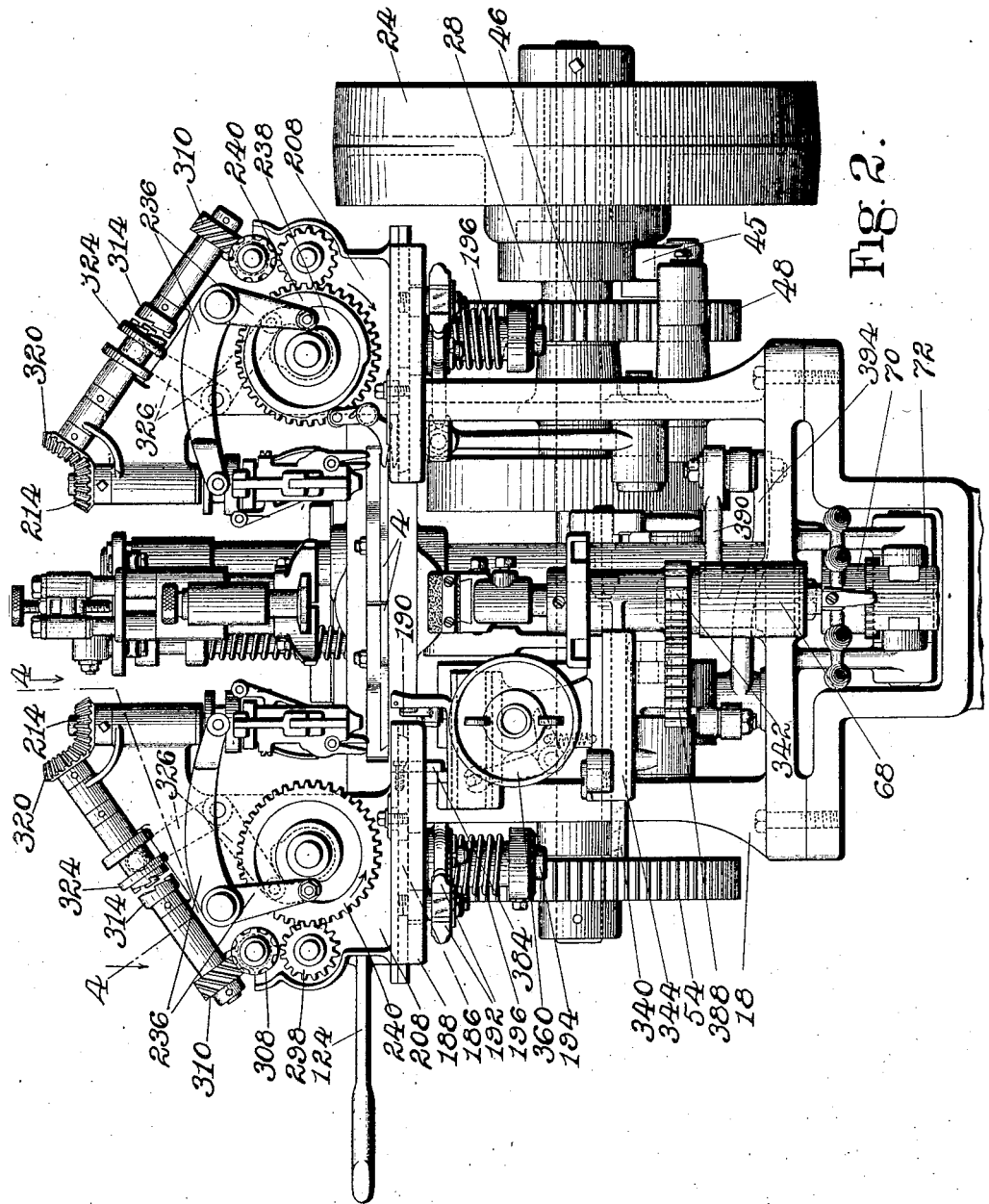
Fig. 2 is a view of the head of the machine in front elevation.
Figure 3:
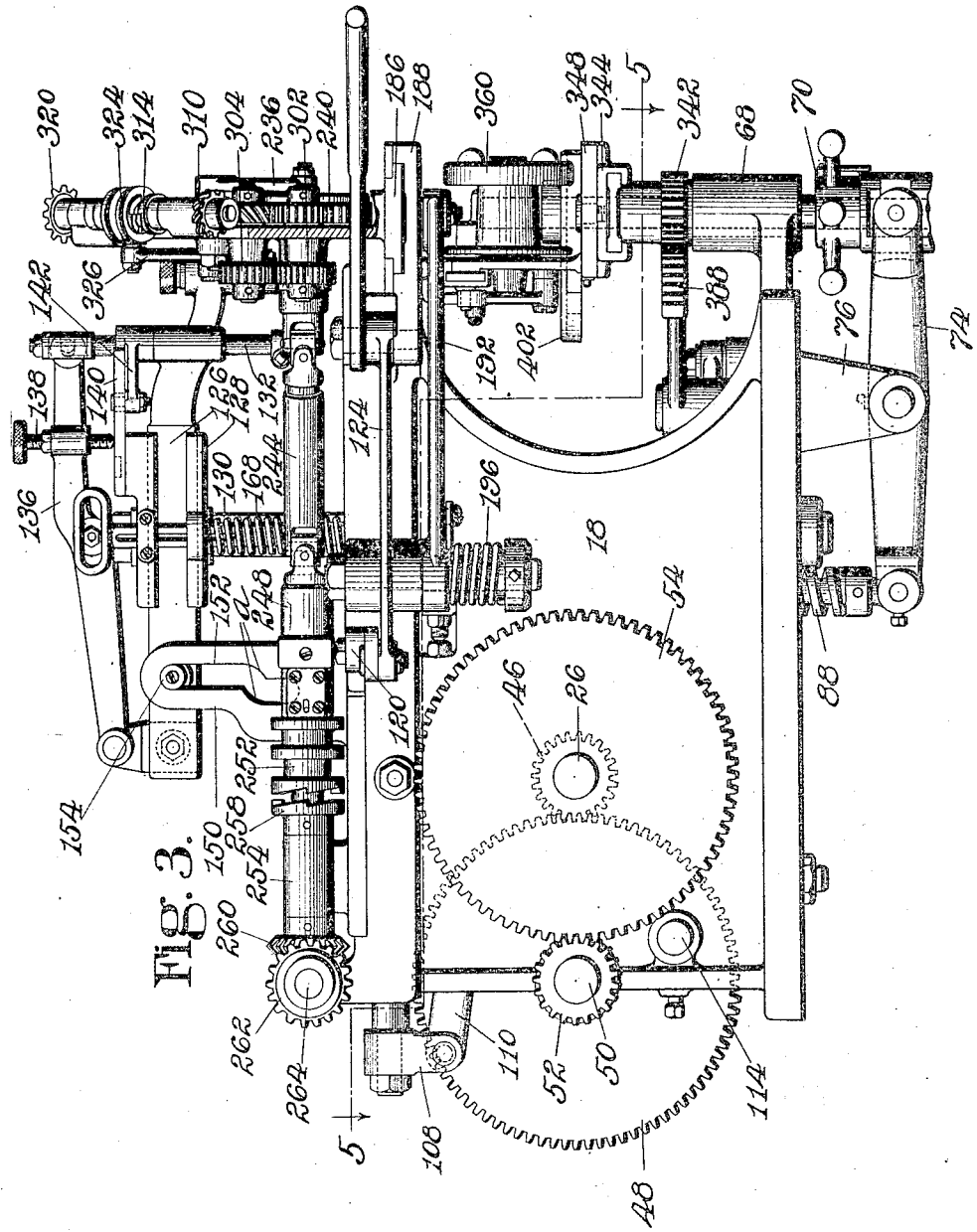
Fig. 3 is a view of the same in side elevation.
Figure 5:
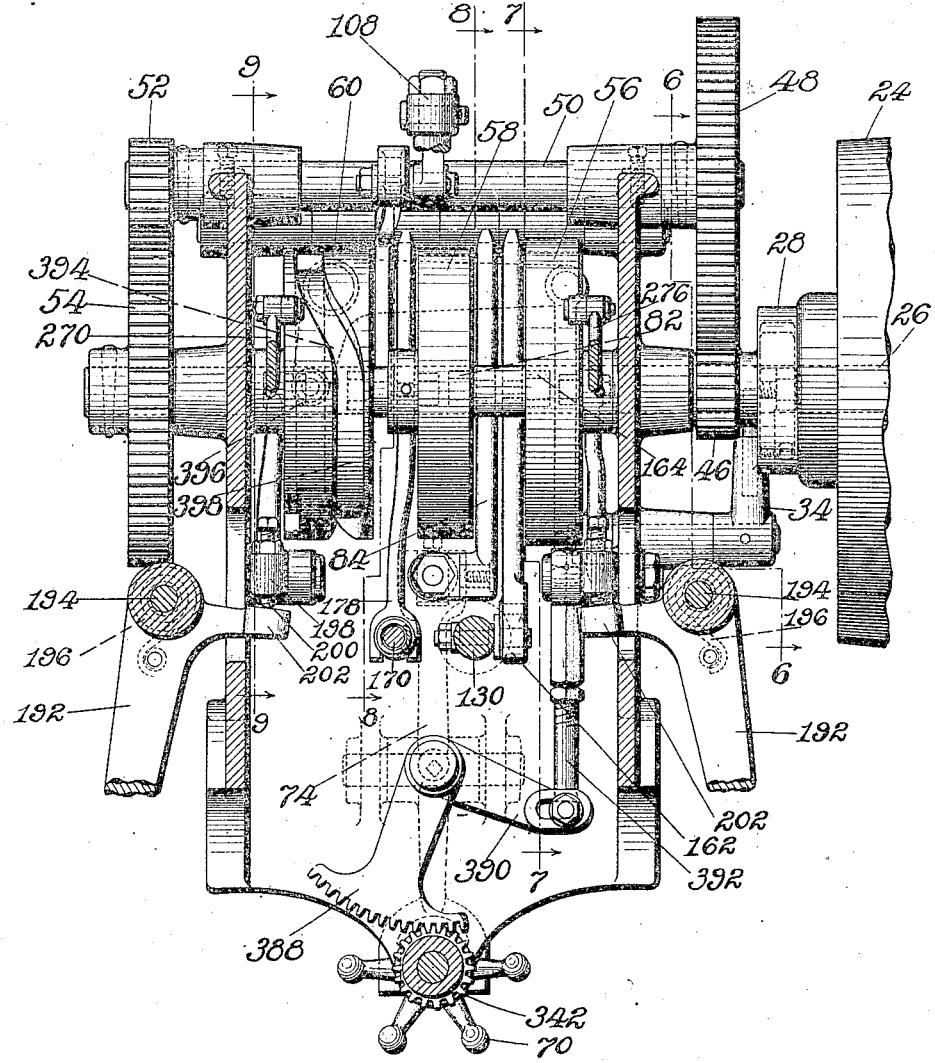
Fig. 5 is a section on the line 5—5 of Fig. 3.
Figure 10:
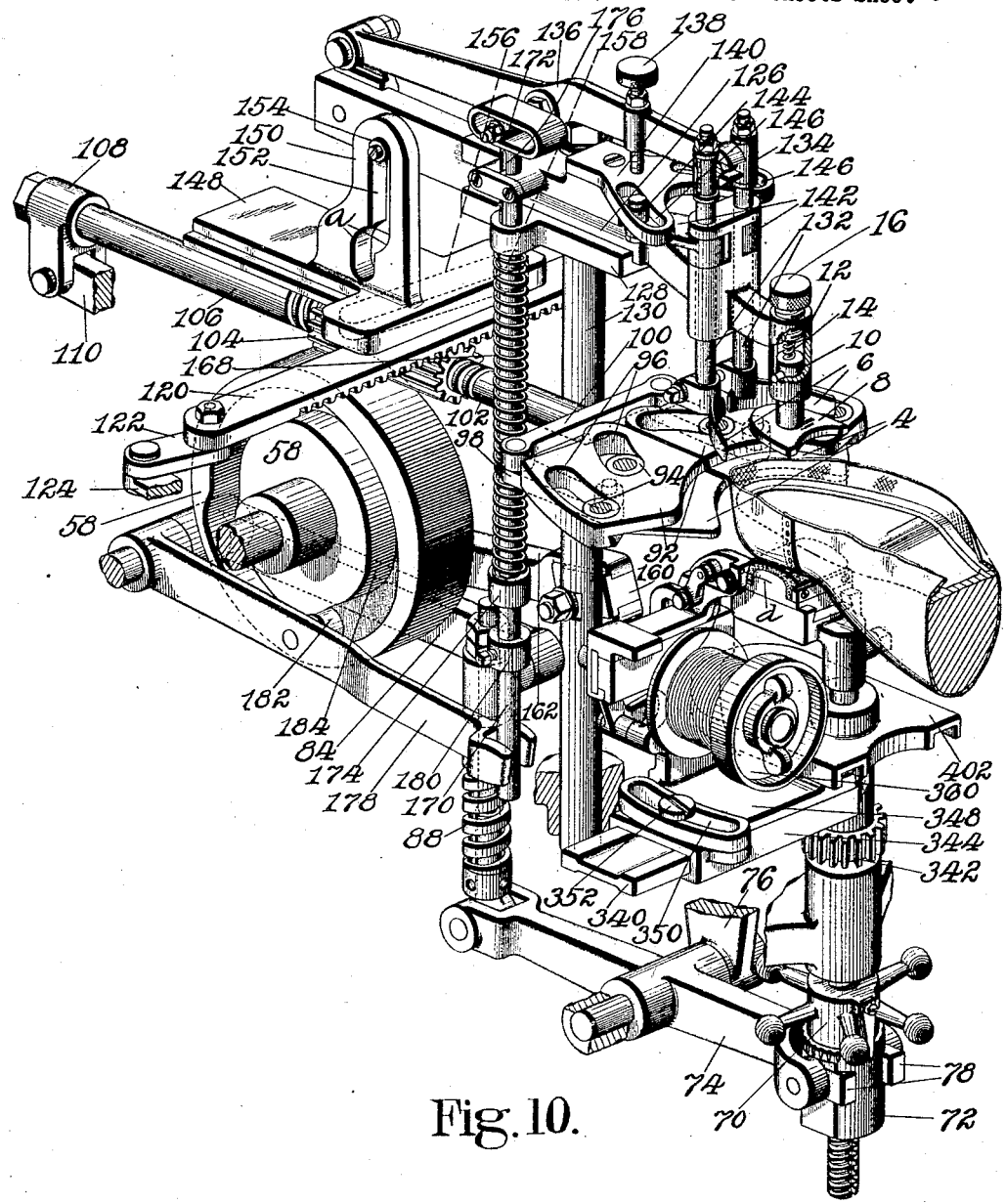

Figs. 6, 7, 8, and 9 are sections taken respectively on the line 6—6, 7—7, 8—8 and 9—9 of Fig. 5;

Fig. 10 is a perspective view of portions of the machine;

Fig. 11 is a view in front elevation on a larger scale than Fig. 2 of one of the tacking and bending mechanisms, with parts shown in section on the line 11—11 of Fig. 12;

Figs. 12, 13 and 14 are sections taken respectively on the lines 12—12, 13—13 and 14—14 of Fig. 11;

Fig. 15 shows partly in front elevation and partly in section the toe support and a portion of the binder applying mechanism;

Fig. 16 is a left hand side elevation of the binder applying mechanism shown in Fig. 15;

Fig. 17 is a section on the line 17—17 of Figs. 15 and 16, and

Figs. 18 to 24 inclusive illustrate successive stages in the operation of the machine on a shoe.

In order to assist in understanding the details of construction to be hereinafter described, it may be briefly stated that the machine comprises in its general organization a toe rest 2 upon which the toe portion of the shoe is supported in inverted position in operative relation to wipers 4 which may be closed manually round the end and side faces of the toe below the plane of the shoe bottom while the shoe is positioned upon the rest 2 by the hand of the operator. Supported substantially over the edges of the wipers 4 is a clamping device or spreader for the margin of the upper comprising a pair of curved clamp members 6 which are moved forward with the wipers and are turned to maintain them in substantially parallel relation to the wiper edges as the wipers are closed round the shoe. Mounted for movement forwardly with the wipers and the clamping device is a holddown member 8 comprising a plate having an edge contour conforming substantially to the curve of the rib of the insole round the toe. The holddown 8 has a stem 10 slidably mounted in a holder 12 and arranged to yield upwardly in the holder against the pressure of a spring 14 as far as permitted by an adjustable stop 16.

Figure 18:
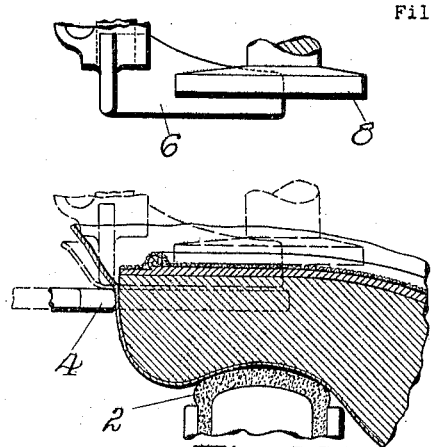
Figure 19:
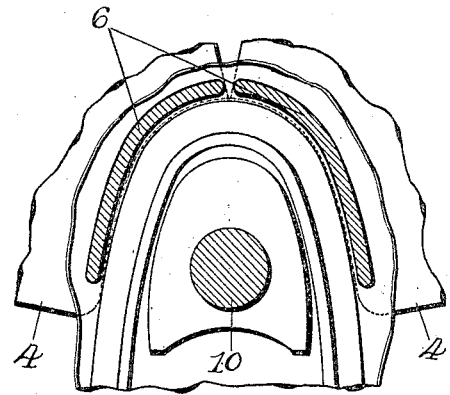
Figure 20:
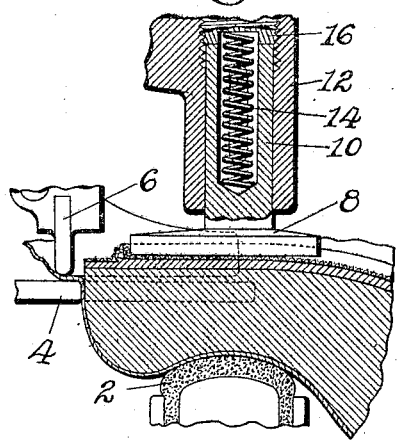
Figure 21:
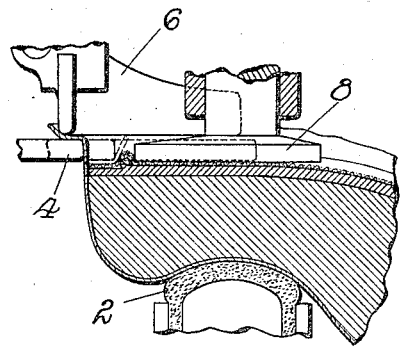

After the wipers have been closed round the toe and the clamping device and the holddown have received simultaneously their positioning movement relatively to the shoe, a clutch is actuated to connect the operating parts of the machine to the source of power. Upon the starting of the machine, the clamp members 6 and the holddown 8 are moved downwardly to cause the clamp members to clamp the margin of the upper upon the wipers and the holddown to engage the insole, as indicated by dotted lines in Fig. 18 and by full lines in Fig. 19. To insure proper engagement of the clamp members with the margin of the upper, the latter may be bent outwardly by the operator in presenting the shoe. As shown in Figs. 19 and 20, the clamp members engage the upper close to the edges of the wipers and the holddown is spaced a short distance rearwardly from the sewing rib of the insole at the end of the toe. In the continued movement of the operating mechanism, during which the clamp members are caused to bear yieldingly upon the upper with gradually increasing pressure and the spring 14 is compressed to increase the pressure of the holddown on the shoe, a reverse movement lengthwise of the shoe is imparted to both the clamp members and the holddown, the clamp members being swung outwardly to spread the upper over the wipers, until the holddown is forced against the end portion of the rib of the insole, as indicated in Fig. 20, to assist in holding the shoe against rearward pressure of the wipers as well as to support the rib against the overwiping pressure. At this point the stop 16 comes into engagement with the stem 10 of the holddown, and in the continued operation of the machine the shoe and the toe rest are forced downwardly by the holddown to cause the upper to be wiped upwardly round the toe by the action of the wipers and finally to position the shoe in the overwiping plane, as indicated in Fig. 21. During this upwiping operation the clamp members 6 act with increasing pressure to clamp the margin of the upper yieldingly against the top face of the wipers while permitting the upper to slip outwardly over the edges of the wipers in response to the pull, thus rendering the wipers effective to wipe the upper free from wrinkles and to draw it tightly over the lateral periphery of the last.

Figure 22:
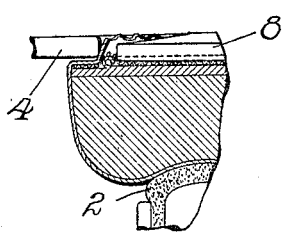
Figure 23:
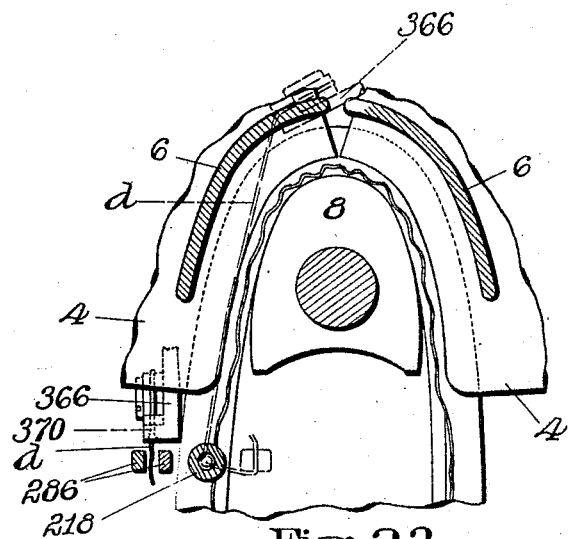

As the operation of the machine continues, the wipers are next advanced and closed inwardly over the feather of the insole. When the wipers have been closed over the edge of the insole and have secured an effective hold upon the upper to prevent it from relaxing over the end and side faces of the toe, the members 6 are lifted to release the margin of the upper. As the wipers are closed inwardly, the toe rest 2 is subjected to increasing upward pressure, and when the wipers have arrived substantially at the end of their overwiping movement the holddown is lifted slightly to permit the shoe to be forced upwardly by the toe rest and compress the overwiped margin of the upper against the wipers. Following this operation the holddown is again moved downward, slightly farther than before, to provide sufficient space between the lower face of the wipers and the shoe to admit a binder wire, as indicated in Fig. 22. While the parts are thus positioned, a tack is partially driven at one side of the shoe and a binder wire is twisted about the tack and drawn firmly round the end of the shoe under the wipers, whereupon a second tack is driven at the opposite side of the shoe and the binder is severed from the source of supply and twisted round said tack. The manner of this operation is indicated generally in Figs. 23 and 24. The upper having thus been secured in lasted position, the parts are returned to their starting positions and the shoe is released.

Figure 6:
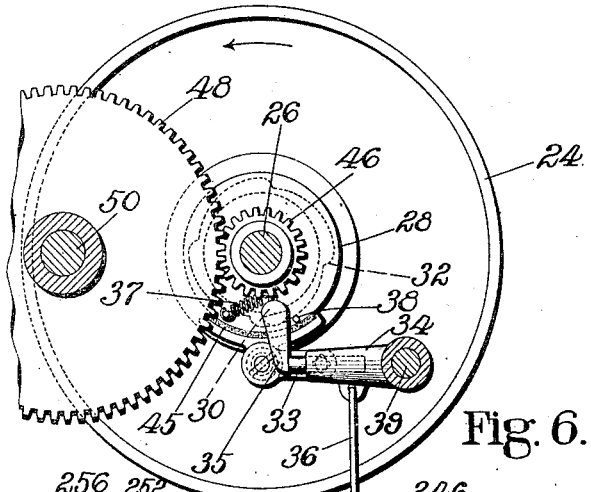
Figure 7:
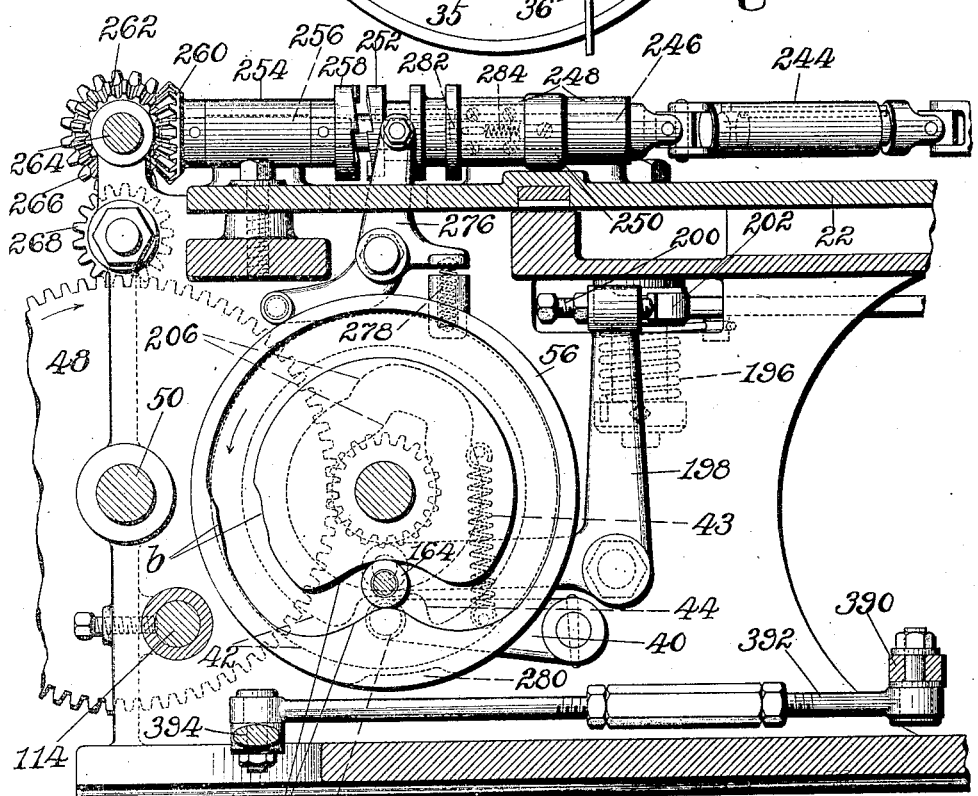
Figure 8:
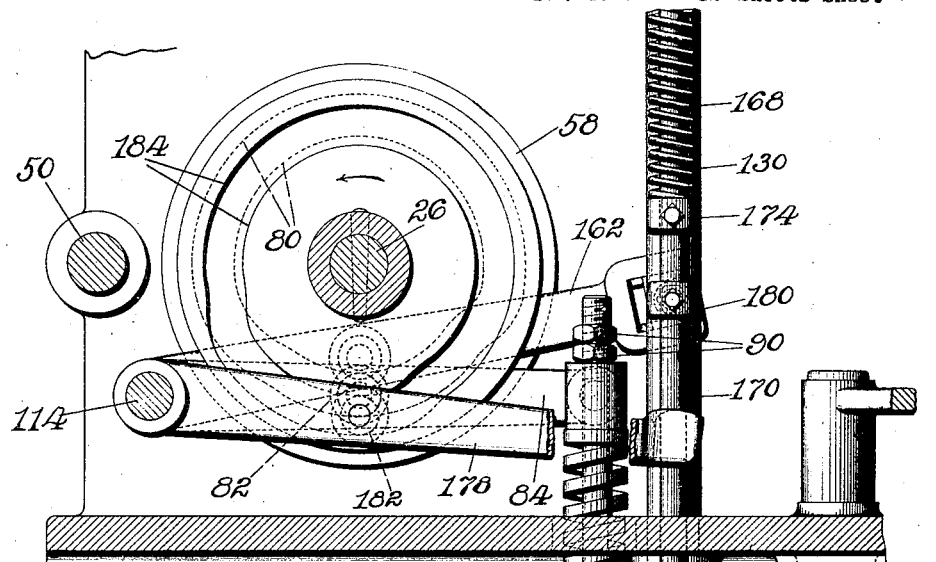

The operating parts of the machine are severally supported upon a frame casting 18 which is mounted upon a standard 20 and is provided with a removable top plate 22. Power is derived from a pulley 24 which is mounted to rotate idly on a shaft 26. To control the application of power to the machine any suitable form of clutch may be utilized, the construction shown comprising a drum 28 (Fig. 6) mounted loosely on the shaft 26 but connected to it by gearing, as hereinafter described, and carrying a clutch dog 30 which is arranged to project within the hub of the pulley 24 and to be turned in such manner as to engage one of a series of shoulders 32 in the pulley hub. The dog 30 is normally held in position to permit the pulley to turn idly by means of a pin 33 adjustably mounted on a controlling lever 34 in position for engagement with a finger 35 fast on the outer end of the dog. When the lever 34 is swung downwardly by means of a rod 36 connected to a starting treadle, not shown, the pin 33 releases the finger 35 and permits a spring 37 to act on the dog 30 to turn it as far as permitted by a stop pin 38 thereby clutching the drum 28 to the pulley. The lever 34 is fast on a rock shaft 39 which carries an arm 40 (Fig. 7) provided with a roll 41 projecting within a groove 42 in the face of a cam wheel 56 fast on the shaft 26. A spring 43 tends to swing the arm 40 upwardly and when the parts are in starting position as indicated in Figs. 6 and 7, the roll 41 is seated in an offset portion 44 of the groove 42 and the pin 33 is positioned in engagement with the finger 35 to disengage the drum 28 from the pulley 24. In this relation of the parts a brake shoe 45, which is mounted on the arm 34, is held in frictional engagement with the drum 28 by the action of the spring 43. After the machine has been started by the depression of the treadle, the groove 42 holds the arm 40 in position to prevent re-engagement of the pin 33 with the finger 35 throughout the cycle of operations of the machine, and upon the completion of the cycle the offset portion 44 of the groove receives the roll 41, permitting the spring 43 to swing the arm 40 upwardly and thus to position the pin 33 in the path of the finger 35, thereby disconnecting the drum from the pulley while applying the brake.

Fast on the drum 28 is a pinion 46 which engages a larger gear 48 secured on one end of a shaft 50 on the opposite end of which is a small pinion 52 in operative engagement with a large gear 54 fast on the opposite end of the shaft 26 from the pulley 24. This mechanism serves as reduction gearing to cause the shaft 26 to be driven at a much slower rate of speed than the pulley. Secured to the shaft 26 are three cam wheels, comprising the wheel 56 above mentioned and wheels 58 and 60 whereby movements are imparted to the various operating instrumentalities.

The toe rest 2 is adjustably supported upon the upper end of a toe post rod 62 (Fig. 15) which is mounted to slide vertically in a bushing 64 supported by means of a flange 66 upon a boss 68 on the frame member 18. At its lower end the rod 62 is threaded for engagement with an adjusting wheel 70 which rests upon a thimble 72 supported on the front end of a lever 74 pivoted on a hanger 76. The connection between the thimble and the lever comprises slide blocks 78 which are mounted in horizontal guideways in the opposite sides of the thimble and are pivoted to the opposite side portions of the forked front end of the lever. By turning the wheel 70 the rod 62 and the toe rest 2 may be adjusted upwardly or downwardly relatively to the toe rest operating mechanism. This mechanism comprises a cam groove 80 (Fig. 8) in the cam wheel 58 in which is mounted a roll 82 on a lever 84, this lever being connected at its front end by means of a rod 86 and a spring 88 to the rear end of the lever 74. In operation the toe rest is pressed upwardly yieldingly through the spring 88 which is compressed by the action of the lever 84 to assist in clamping the shoe against the holddown and to afford the upward pressure required for pressing the overwiped upper against the wipers, this spring also affording provision for yield to permit the shoe to be forced downwardly in the upwiping operation and subsequently farther downwardly to admit the binder wire. Nuts 90 on the rod 86 provide means for adjusting the force of the spring 88 by movement of the lever 74, and when such adjustment is effected a compensating adjustment of the toe rest may be made by turning the hand wheel 70 in order to position the shoe correctly in relation to the wipers. An alternative means for adjusting the force of the spring, eliminating any need for a compensating adjustment of the wheel 70, comprises a nut 91 on the rod 86 below the spring. It will be evident by reference to the shape of the cam groove 80 that downward movement of the lever 84 does not begin immediately upon the starting of the machine, the interval previous to the beginning of such movement comprising substantially that portion of the cycle during which the holddown is lowered and forces the shoe downwardly to effect the upwiping operation round the toe. At about the time when the holddown arrives at the limit of this movement the lever 84 begins to move downwardly to increase the force of the spring 88 and continues such downward movement until slightly after the completion of the overwiping operation to provide the requisite upward pressure against the wipers when the holddown is lifted to permit the compression of the overwiped stock.

Figure 9:
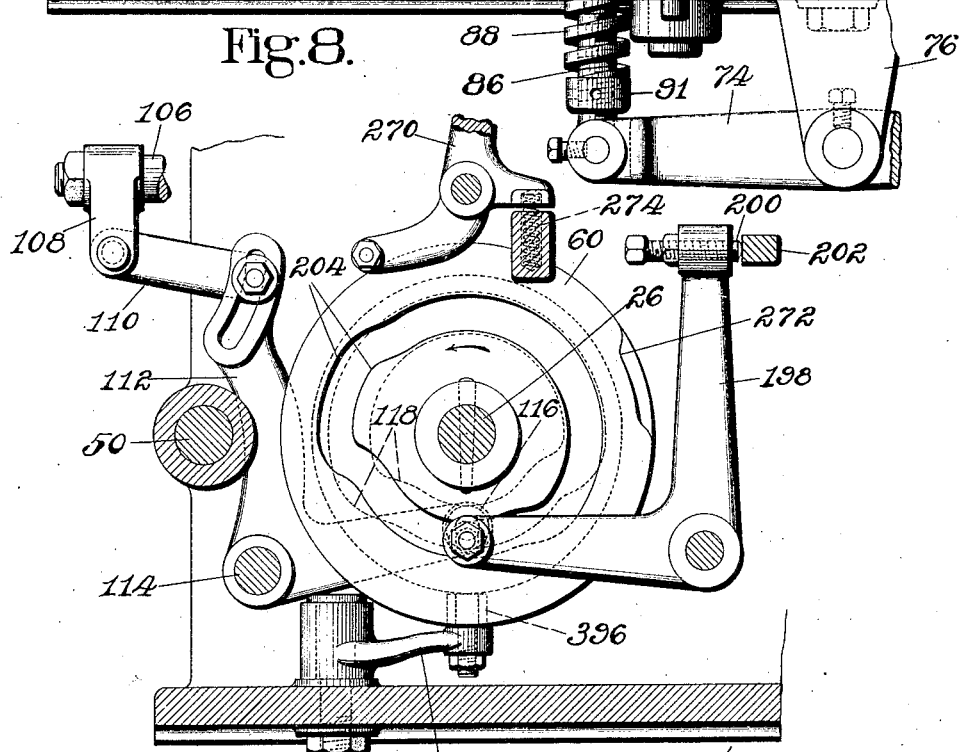

The wipers 4 are secured in a well-known manner to carriers 92 which are mounted on the lower side of the cover plate 22 and are guided for advancing and closing movements by means of rolls 94 which are mounted on the cover plate and engage in curved slots 96 in the carriers 92 to impart predetermined closing movement to the wipers in response to their advancing movement. Links 98 connect the carrier plates 92 to a cross bar 100 which is mounted on the front end of an operating rod 102. The rod 102 is threaded in an elongated pinion 104 in the opposite end of which is threaded a rearwardly extending rod 106 connected by means of a lug 108 and a link 110 to a bell-crank lever 112 mounted on a pivot rod 114 (Fig. 9). The lever 112 carries a roll 116 which engages in a cam groove 118 in the cam wheel 60. The opposed ends of the rods 102 and 106 are oppositely threaded and coöperate with the pinion 104 to provide a turn buckle whereby the rod 102 may be moved forward relatively to the rod 106 for advancing and closing the wipers manually round the end of the shoe before the machine is started. Turning movement for this purpose is imparted to the pinion 104 through a rack bar 120 which is mounted to slide in a guideway in the cover plate 22 and is connected by a link 122 to a hand lever 124. By reference to the shape of the cam groove 118 (Fig. 9) it will be seen that the power-effected movement of the wipers does not begin until after a sufficient interval of time to permit the shoe to be depressed by the holddown to the overwiping plane. The wipers are then advanced and closed by the action of the cam and are held in their closed position during subsequent operations on the shoe. As shown in Fig. 9, the link 110 is adjustably connected to the bell-crank 112 for varying the extent of the operative movement of the wipers.

Figure 4:
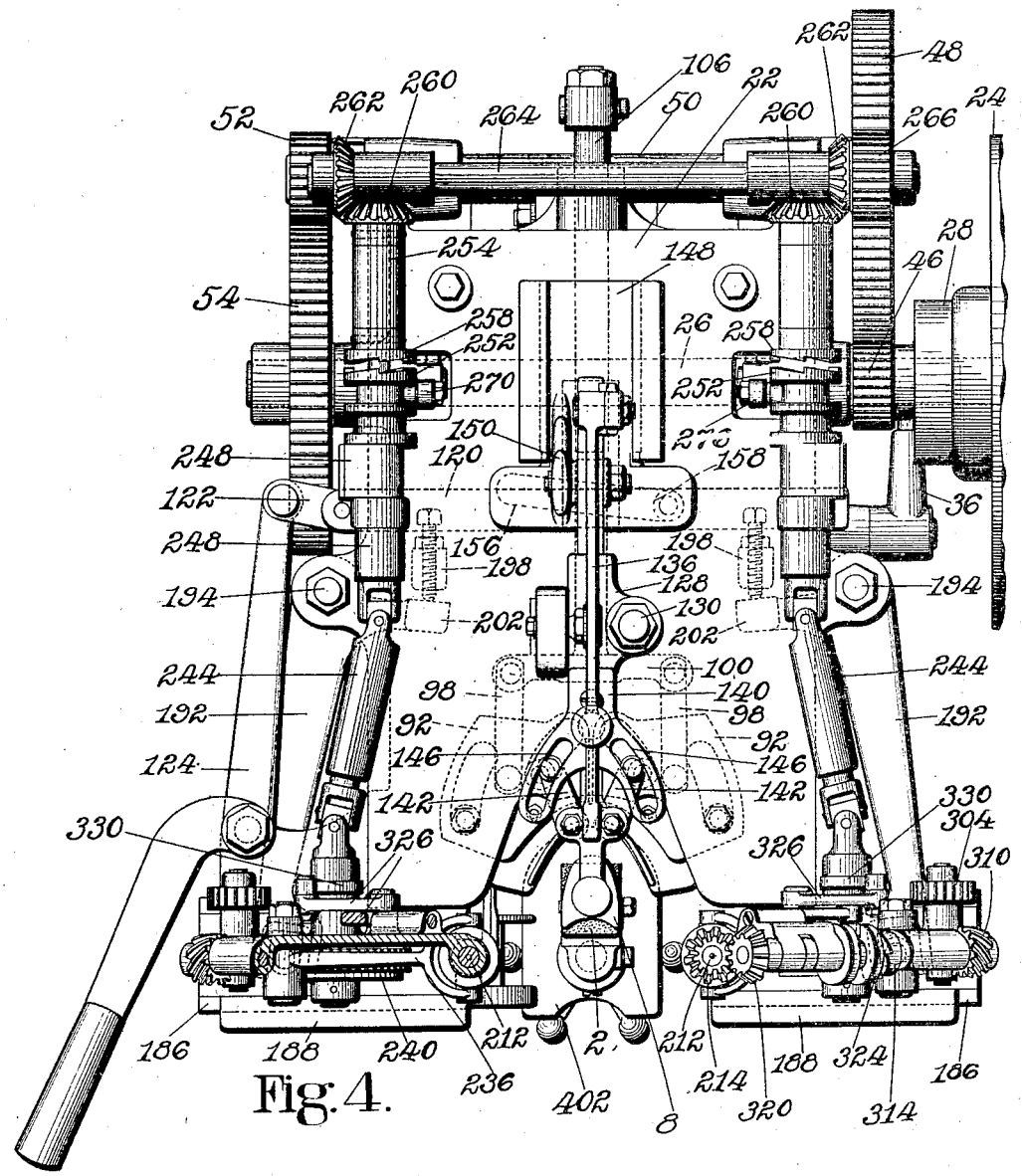
Fig. 4 is a plan view with a portion of the structure in section on the line 4—4 of Fig. 2.

The holder 12 on which the holddown 8 is mounted in the manner hereinbefore described comprises a forwardly extending portion of a supporting slide 126 mounted in a guideway on a holder 128 fast on the upper end of a rod 130. Supported also on the forwardly projecting portion of the slide 126 are the clamp members 6, these members being adjustably secured on the lower ends of rods 132 which extend upwardly through bearings in the slide and at their upper ends are rotatably supported in a yoke member 134 the intermediate portion of which is mounted in the forked front end of a lever 136. The lever 136 is horizontally pivoted at its rear end on the slide 126 and carries a stop screw 138 which is arranged to engage a plate 140 on the holder 128 to determine the height of the clamp members relatively to the holddown when the parts are in starting position. Keyed to the rods 132 in such manner that the rods are permitted to slide vertically through them are arms 142 which carry rolls 144 engaging in curved slots 146 in the plate 140, these slots being curved similarly to the slots 96 in the wiper carriers. The purpose of this construction is to determine the position of the clamp members with respect to lateral swinging movement, these members being maintained initially in substantially parallel relation to the wiper edges, as shown in Fig. 4.

As hereinbefore explained, the initial manually effected advancing and closing movement of the wipers is accompanied by a corresponding forward movement of the holddown and the clamp members. This is effected by means of a slide 148 mounted in guideways on the plate 22 and having an upwardly extending projection 150 provided with a slot 152 to receive a roll 154 which is mounted on the slide 126. In its lower face the slide 148 is provided with a straight slot 156 extending at an angle to the direction of movement of the slide and arranged to receive a roll 158 mounted on the rack bar 120. Operative movement of the rack bar for turning the pinion 104 and advancing the wipers thus serves to impart to the slide 148 a corresponding forward movement and through the slide 126 to move the holddown and the clamp members also forwardly, the latter being closed inwardly by the action of the slots 146 on the rolls 144 to maintain them in substantially parallel relation to the wiper edges as the wipers are closed against the shoe. After the manually effected closing of the wipers the slide 148 is maintained in its advanced position by the action of the roll 158.

For imparting operative downward movement to the holddown 8 and the clamp members 6 the rod 130, the lower end of which is guided in an opening in the frame, is connected by means of a pivoted bearing block 160 to the forked front end of a lever 162 which carries a roll 164 engaging in a cam groove 166 in the cam wheel 56 (Fig. 7). It will be evident that the lever 162 receives operative downward movement from the cam immediately upon the starting of the machine to carry the holddown and the clamp members into engagement with the work. In such downward movement of the holder 128 the roll 154 is carried downwardly along the straight upper portion of the slot 152 until it arrives at a portion $a$ of the slot which is offset rearwardly and the action of which is to produce a rearward movement of the slide 126 in its continued downward movement. This rearward movement begins substantially at the time when the holddown and the clamp members come into engagement with the work and serves to move these parts rearwardly in such manner as to force the holddown against the end portion of the rib of the insole and to carry the clamp members outwardly over the top face of the wipers, as will be evident by a comparison of Figs. 19 and 20. In this operation the cam slots 146 by their action on the arms 142 serve to swing the clamp members outward laterally of the shoe a distance corresponding substantially to the extent of movement of said members away from the end face of the shoe, thereby spreading the margin of the upper over the top face of the wipers. Below its offset $a$ the slot 152 is provided with another straight vertical portion along which the roll 154 travels during the latter part of the downward movement of the holder 128 whereby the shoe is depressed to the overwiping plane, the corresponding portion of the movement of the holddown being effected positively through the engagement of the stop 16 with the upper end of the stem 10.

By refrence to the shape of the cam 166 (Fig. 7) it will be seen that after the holddown has received its downward movement to force the shoe to the overwiping plane it is held at rest in such position for a time, corresponding substantially to the period during which the overwiping operation is effected. Substantially at the end of the overwiping movement of the wipers the portion $b$ of the cam track 166 arrives in position to raise the holddown slightly, permitting the shoe to be forced upward by the toe rest to compress the overwiped stock upon the feather of the insole. Immediately following this operation the holddown is again depressed by the action of its cam to a slightly lower limit than previously, thus depressing the shoe sufficiently to permit the binder wire to be drawn inward underneath the wipers. The shoe is then maintained in this depressed position while the binder is applied to the shoe and fastened in place.

By reference to Figs. 18 and 20 it will be seen that the clamp members 6 extend initially below the plane of the holddown 8 a distance corresponding substantially to the distance between the plane of the shoe bottom and the top face of the wipers, and it will be evident that in the depression of the shoe to the position shown in Fig. 21 the clamp members are required to yield upwardly. Provision for such yield is afforded by the manner in which the rods 132 are slidably mounted and by the pivotal connection of the lever 136 to the slide 126. The required clamping pressure of the clamp members upon the upper is effected by a spring 168 which is mounted on a rod 170 extending upwardly through lugs on the side of the holder 128 and having a slotted T-shaped upper end portion to receive a roll 172 mounted on the side of the lever 136. The spring 168 bears downwardly against a collar 174, adjustable to vary the force of the spring, and thus tends to depress the lever 136 and the connected clamp members as far as permitted by the stop screw 138. During the latter portion of the downward movement of the holder 128, after movement of the clamp members has been stopped by the wipers, the spring 168 is compressed and the clamp members are thus caused to bear with increasing pressure upon the clamped margin of the upper. A key engaging in a slot 176 in the rod 170 serves to prevent the rod from turning. Lifting of the clamp members is effected by means of a lever 178 the forked end portion of which is arranged to engage a collar 180 adjustably secured on the rod 170. The lever carries a roll 182 which extends within a cam groove 184 in the cam wheel 58, whereby the lever is operated. As previously stated, the clamp members are preferably lifted to release the upper as soon as the wipers have wiped the upper over the outer edge of the insole and before they have completed the overwiping operation, or at all events before the shoe is depressed to admit the binder, thus leaving the margin of the upper free to be wiped closely into the angle between the feather and the rib of the insole and avoiding any danger of pulling the upper away from the feather of the insole by the depression of the shoe. The time of the lifting of the clamp members, however, may be varied by adjusting the collar 180. It will be evident that the connection between the upper end of the rod 170 and the lever 136 is such as to permit movements of the slide 126 forwardly and backwardly in its holder 128.

For driving the binder fastening tacks and for twisting or bending the ends of the lasting binder round the tacks, separate mechanisms are provided at the opposite sides of the shoe. These mechanisms comprise slides 186 which are mounted in guideways on projecting plates 188 for inward and outward movements laterally of the shoe. Each of the slides 186 carries a stop plate 190 for engagement with the side of the shoe to limit the inward movement of the mechanism and position it in proper relation to the shoe, this plate being adjustably inwardly or outwardly to vary the location of the tack. Each of the slides is connected on its lower side to the forked front end of a lever 192 which is mounted upon a pivot 194 on the frame of the machine and is operated upon by a coil spring 196 which tends to swing the lever in a direction to force the slide 186 inwardly toward the shoe. The action of each lever is controlled by a bell-crank 198, (Figs. 7 and 9) provided with an adjustable contact screw 200 which engages a projection 202 on the lever. The bell-crank 198 at the left hand side of the machine carries a roll which engages in a cam groove 204 in the cam wheel 60 (Fig. 9). The bell-crank 198 at the right hand side of the machine carries a roll which engages in a cam groove 206 in the cam wheel 56 (Fig 7). The action of these bell-cranks is to release the levers 192 to the action of their springs and permit them to force the slides 186 inwardly against the shoe. By reference to Figs. 7 and 9 it will be seen that the slide at the left hand side of the shoe is forced inwardly immediately after the overwiping operation has been completed by the action of the cam 118, and that the inward movement of the slide at the other side of the shoe by the action of the cam 206 takes place at a later time following an interval during which the tack is driven and the binder twisted round it at the left hand side and during which the binder is drawn round the shoe and into position to be fastened at the right hand side, as will be explained. By adjustment of the screws 200 the initial positions of the slides 186 laterally of the shoe may be varied as desired.

Since the tack driving and wire bending mechanisms at the opposite sides of the shoe are substantially identical in construction, with the exception of such changes as are due to the opposite locations of the mechanisms and to their operations at different times, a description of the details of the mechanism at one side will suffice for an understanding of both. The mechanism which operates at the right hand side of the shoe is shown in detail in Figs. 11 to 14 inclusive. The slide 186 carries a vertical supporting plate 208 which at its upper end is provided with a bearing 210 for a stem 212, the latter having a vertical central bore to admit a tack string c and to guide the tacks to their driving position. This stem or guide receives rotative movement, as will be hereinafter explained, from a beveled pinion 214 which is fast on the stem and supports it vertically. Mounted to slide vertically on the stem 212 is a sleeve 216 which terminates at its lower end in a tack nozzle 218. Pivotally mounted in opposite recesses in the sleeve 216 are driver members 220 which project inwardly underneath the lower end of the stem 212 for driving the tack and have the additional function of severing the lowermost tack from the tack above it. The members 220 are connected by links 222 to a spool 224 which is also mounted to slide vertically on the stem 212. A friction plug 226 in the sleeve 216 serves as a retarder to render the spool 224 effective to swing the members 220 inwardly and outwardly in proper time relation to their bodily vertical movements. It will be understood that when the spool 224 is forced downwardly the inner ends of the members 224 are forced inwardly over the head of the lowermost tack and that by the continued downward movement of the spool the members 220 together with the sleeve 216 and its tack nozzle 218 are moved downwardly to drive the lowermost tack into the shoe while the nozzle is moved toward and it may be into engagement with the shoe, the tack thus being left partially projecting from the shoe a distance equal at least to the length of the nozzle. As the resistance increases in the operation of driving the tack, the spool 224 brings sufficient pressure to bear upon the members 220 to cause their sharpened inner ends to sever the tack when the latter has arrived substantially or approximately at the end of its driving movement. A nut 228 adjustably threaded on the sleeve 216 serves as a stop for the spool 224 to prevent damage through undue pressure of the members 220 against each other.

It will be evident that the members 220, in addition to their driving and cutting functions, serve as feeding means for the string of tacks. When the spool 224 subsequently receives its upward return movement it acts to swing the members 220 outwardly and then to move them upwardly with the sleeve 216 while leaving the string of tacks in its downwardly fed position. In order to hold the string of tacks in its proper position until the next driving operation, a resilient pawl 230 is secured to the stem 212 and extends through a slot in the stem into engagement with the tack string. By reference to Fig. 11 it will be seen that this pawl is arranged to project over the head of one of the tacks when the parts are in starting position. In order further to insure the proper feeding of the string of tacks in case the lowermost tack is severed before the driving operation is completed, an auxiliary feed pawl 232 is provided, this pawl being pivoted on the spool 224 and operated upon by a spring 234 which presses it inwardly through slots in the sleeve 216 and the stem 212 into position to project over the head of the second tack when the parts are in starting position. By engagement with the side of the sleeve 216 the pawl 232 is held from pressing objectionably against the string of tacks.

Operative movement is imparted to the spool 224 by a bell-crank lever 236 having a substantially horizontal arm provided with rolls for engagement in a peripheral groove in the spool and a depending arm carrying a roll which projects within a cam groove 238 in a cam wheel 240 fast on a shaft 242 which is mounted in bearings in the plate 208. The shaft 242 is connected by a universal joint to a shaft section 244 comprising two telescoping portions (Fig. 7) keyed together and relatively movable lengthwise, the section 244 being connected by a universal joint to a shaft 246 mounted in bearings 248 on the plate 22. A collar 250 fast on the shaft 246 between its bearings restrains the shaft from lengthwise movement. Keyed on the rear end of the shaft 246 and slidable lengthwise upon it is a clutch hub 252. Mounted in a bearing 254 is a short shaft 256 which is in alinement with the shaft 246 and carries a co-operating clutch member 258. Secured on the rear end of the shaft 256 is a beveled pinion 260 which is in operative engagement with a pinion 262 on a shaft 264 which extends transversely of the machine at its rear end. The shaft 264 is driven by the gear 48 through connecting pinions 266 and 268. It will be understood that the clutch member 258 at each side of the machine is driven continuously by the gear 48 throughout the cycle of operations of the machine. The engagement of the clutch member 252 at the left hand side of the machine with its co-operating member 258 is controlled by means of a lever 270 (Figs. 4 and 9) which has at its upper end a roll engaging in a peripheral groove in the clutch hub and at its lower end a roll which engages the periphery of the cam wheel 60. At that point in the cycle of operations when the tack at the left hand side of the shoe is to be driven a notch 272 in the wheel 60 arrives in position beneath the roll at the lower end of the lever 270 and permits a spring 274 to swing the lever in a direction to connect the clutch member 252 to the member 258. When this connection is made, operative movement is imparted through the mechanism above described to the wheel 240, and the bell-crank 236 is operated by its cam to drive the tack in the manner hereinbefore explained. The clutch member 252 at the right hand side of the machine is similarly controlled by a lever 276 (Fig. 7) to which movement is imparted by a spring 278 when permitted by a notch 280 in the periphery of the wheel 56. By comparison of Figs. 7 and 9 it will be seen that the notches 272 and 280 are so related as to cause the tacker mechanism at the right hand side to be operated at a later time than the mechanism at the left hand side.

It will be understood that in the operation of each tacker mechanism a complete revolution is imparted to its cam wheel 240. In order that this wheel may be stopped in the proper starting position, a locking mechanism is provided, comprising a pin 282 (Fig. 7) slidably mounted in one of the fixed bearings 248 and pressed by a spring 284 toward the end face of the clutch hub 252 which has a depression to receive the end of the pin when the wheel 240 is in the starting position shown in the drawings. When the clutch hub is moved into operative engagement with the member 258 it is carried out of engagement with the locking pin. In order to insure that the different clutch hubs 252 shall be locked in the required starting positions, the notches 272 and 280 are of such length as to cause the hubs 252 to receive their movements away from the members 258 slightly before the depressions in their end faces have arrived in position to receive the locking pins, the momentum of the parts being depended upon to carry each hub the short distance required to cause its depression to register with the pin.

For bending the binder wire round the partially driven tack each of the tacker mechanisms is provided with a bending device comprising a pair of gripper jaws 286 which are pivotally mounted in a vertical slot in the sleeve 216 and are carried downwardly and upwardly with the sleeve. Between the shank portions of the gripper jaws is a cam 288 having a finger 290 projecting within a slot 292 in the stem 212 which, as hereinbefore explained, is fixed against vertical movement. At the lower end of the slot 292 is a ledge or abutment 294 into engagement with which the finger 290 is carried by the downward movement of the sleeve 216 in the tack driving operation. In this manner the cam 288 is turned to force the shank portions of the gripper jaws apart and thus to close the jaws upon the binder wire. By reference to Fig. 23 it will be seen that the end of the wire $d$ is positioned at the left hand side of the shoe in the path of downward movement of the left hand pair of gripper jaws to permit the wire to be received between the jaws. After the wire has been gripped the jaws are held in their closed position by automatic action of the cam 288 until, upon the final return movement of the sleeve 216, the finger 290 is carried into engagement with the lower end of a key 296 whereby the cam is turned to permit the jaws to open. The key 296 locks the sleeve 216 and the spool 224 to the stem 212 to cause these parts to turn in unison for bending the wire round the tack when the pinion 214 is rotated, as will now be explained.

By reference to Figs. 11 and 13 it will be seen that each wheel 240 is provided with a peripheral series of gear teeth in operative engagement with a pinion 298 on a shaft 300 which carries at its opposite end a pinion 302 in engagement with a pinion 304 on a shaft 306, the latter carrying at its opposite end a spiral gear 308 in engagement with a co-operating gear 310 on an inclined shaft 312. At its upper end the shaft 312 carries a clutch member 314 which is driven continuously throughout the cycle of rotation of the wheel 240. Mounted in bearings 316 in alinement with the shaft 312 is a shaft 318 upon the upper end of which is secured a beveled pinion 320 which engages the pinion 214 on the stem 212. A collar 322 fast on the shaft 318 between the bearings 316 restrains the shaft from lengthwise movement. Keyed on the lower end of the shaft 318 and slidable thereon is a clutch hub 324 which is movable into and out of engagement with the member 314. For controlling the clutch member 324 there is provided a bell-crank 326 the upper arm of which carries a roll which extends within a peripheral groove in the member 324 and the lower arm of which is provided with a roll 328 that bears upon a peripheral cam 330 on the shaft 242. A spring operated plunger 332 bears upon the upper arm of the bell-crank 326 to hold the roll 328 in engagement with its cam and serves to impart operative movement to the bell-crank to force the clutch hub 324 into engagement with the member 314 when the cam 330 permits. By reference to Fig. 11 it will be seen that the cam 330 does not release the roll 328 to permit the clutch members 314 and 324 to engage with each other until after the bell-crank 326 has been operated to drive the tack and to cause the gripper to grip the wire. It will also be seen that the cam groove 238 is so shaped as to impart a partial reverse movement to the bell-crank 236 before the clutch members 314 and 324 are permitted to engage with each other. This serves to lift the tack nozzle 218 from the shoe a sufficient distance to permit the gripper 286 to clear the shoe as it is turned round the tack and also to insure sufficient space for the binder wire under the nozzle. As soon as the clutch member 324 is carried into engagement with the member 314 turning movement is imparted to the stem 212, the sleeve 216 and the spool 224. The gripper 286 is thus operated to bend or twist the end of the wire round the shank of the partially driven tack in the manner illustrated in Fig. 23. During this operation the head portion of the tack projects within the nozzle 218 which assists in holding the tack rigidly against the pull of the wire. During the movement of the gripper round the tack both jaws 286 are permitted to swing inwardly about their pivot in response to the pull of the wire, the jaws being held normally in an outwardly inclined position through the action of a spring plate 334 which bears against the shank portion of the outer jaw. The direction of movement of the gripper is such that it swings inwardly at the rear of the tack, thus drawing the binder inwardly over the margin of the upper and tightening it and in the initial portion of its movement bending the binder partially round one of the gripper jaws to insure an effective hold of the gripper on the binder.

The turning movement of the gripper continues during the greater portion of the revolution of the wheel 240, the gripper receiving two complete revolutions in order to bend the wire twice round the shank of the tack. The cam 330 becomes effective to impart a reverse movement to the bell-crank 326 before the two revolutions of the gripper have been completed, and preferably when the gripper has made substantially three-fourths of its second revolution, as indicated by dotted lines in Figs. 23 and 24. The purpose of this is to insure that the gripper shall be stopped in a predetermined position by a locking device which is shown in detail in Fig. 14. This device is similar to the locking devices associated with the clutch members 252 and comprises a spring pressed pin 336 which is mounted in a part integral with the bearings 316 and is arranged to enter a recess 338 in the adjacent end face of the hub 324. The latter is moved back against the pin by the bell-crank 326 slightly before the recess 338 arrives in position to receive the pin, the momentum of the parts being depended upon to carry the hub 324 the remaining distance to cause the parts to come to rest in the correct starting position. Substantially at the time when the bell-crank 326 receives its clutch disconnecting movement a further reverse movement is imparted to the bell-crank 236 to move the gripper and tacker mechanism farther upwardly and away from the tack and to cause the gripper to be opened by the action of the cam 288.

As hereinbefore explained, and as will be evident by reference to the relative positions of the notches 272 and 280 in the cam wheels on Figs. 9 and 7 respectively, the tacking and bending mechanism at the left hand side of the shoe is operated to drive a tack and to bend the wire round it a considerable time before the corresponding operations are performed at the other side of the shoe. Before the bending of the wire is completed at the left hand side of the shoe the binder applying device which draws the wire round the end of the shoe begins its operative movement. As shown in Figs. 15, 16 and 17, a supporting bracket 340 is fast on the hub of a pinion 342 rotatably mounted on the bushing 64 which encircles the toe post 62, this bracket providing a guideway for a slide 344 upon which is pivotally mounted at 346 a plate 348. At its outer end the plate 348 is provided with a curved slot 350 to receive a guiding screw 352 which is threaded into the end of the slide 344. Projecting upwardly from the plate 348 is a bracket 354 mounted on which is a pin 356 which provides a support for a rotatable spool 358 for a coil of binder wire. The outer end flange 360 of the spool is detachably secured in position by a wing nut 362 to permit its removal when a new coil of wire is to be inserted. The end of the binder wire extends from the spool over a roll 364 on a slide 366 which is mounted on a horizontal guide plate 368 on the bracket 354. From the roll 364 the wire extends through an opening 370 in the slide 366, the slide thus serving as a guide for the wire. In order to increase the resistance in such manner as to cause the wire to be drawn tightly round the shoe, a second roll 372 is provided to press the wire forcibly against the roll 364, the roll 372 being mounted on a lever 374 on the slide 366, this lever having at its lower end a spring 376 which bears on the slide 366 and holds the roll 372 against the wire with a pressure determined by an adjustable tension screw 375. Movement of the slide 366 along its guideway is controlled by a bell-crank 378 provided with an upper forked end connected to a pin 380 on the slide and operated upon at its lower end by a spring 382. It will thus be evident that the bell-crank 378 tends to move the slide 366 inwardly toward the shoe. A stop screw 383 by engagement with the lower arm of the bell-crank 378 limits adjustably the inward movement of the slide 366. Initially the slide 366 is held outwardly away from the shoe by the action of the left hand tacker slide 186 which has a lug 384 projecting downwardly for engagement with a co-operating lug 386 on the slide 366. When the slide 186 is moved inwardly toward the shoe, as hereinbefore explained, the bell-crank 378 is permitted to act to move the slide 366 also inwardly toward the shoe until its upper end portion in which the end of the wire *d* is held arrives substantially or approximately in shoe engaging position. The end of the wire is thus positioned in the correct relation to the shoe to be engaged by the left hand gripper. After the inward movement of the slide 366 has been stopped by the shoe the slide 186 continues its inward movement until its contact member 190 engages the shoe at the rear of the shoe engaging portion of the slide 366. The tack is then driven and the wire twisted round it as hereinbefore explained.

For imparting operative movement to the supporting bracket 340 to cause the wire to be drawn round the shoe under the wipers by the binder applying device the pinion 342 is connected to a gear segment 388 (Fig. 5) which is pivotally mounted on the frame of the machine and carries an arm 390 having a slotted end connected to a rod 392 the rear end of which is connected to one arm of a bell-crank 394. The opposite arm of the bell-crank 394 carries a roll 396 mounted in a peripheral cam groove 398 in the cam wheel 60. Through these connections the segment 388 is operated to swing the binder applying device round the end of the shoe a distance determined by adjustment of the rod 392 in the slotted end of the arm 390, this movement of the device beginning as soon as the gripper has secured a firm hold of the end of the wire and has started to bend it round the tack.

In order further to control the movement of the binder applying device in its relation to the shoe, in such manner as to avoid objectionable friction between the wire guide and the shoe and also to prevent the wire from binding objectionably in the guide, additional means is provided comprising a cam groove 400 in a guide member 402 fast on the upper end of the bushing 64 and co-operating rolls 404 which are mounted on the plate 348 and project within the groove. This groove is so shaped and is disposed in such relation to the edge of the shoe bottom as to guide the binder applying device in a positively determined path about said edge and to cause the slide 344 to move outwardly along the support 340 as the latter is swung round the left hand corner of the toe and to move reversely inward along the support as the latter is swung round the opposite corner of the toe. Preferably the groove 400 is so shaped as to move the wire guide outwardly from the shoe a sufficient distance to permit it to be held by the stop screw 383 out of engagement with the shoe as it is carried round the end of the toe. A further effect of the two rolls 404 in co-operation with the cam groove is to cause a relative swinging movement between the plate 348 on which the wire guide is supported and the supporting arm 340, the plate 348 assuming an angular relation to the arm 340 at the left hand side of the latter (Fig. 17) as the parts move round toward a position parallel to the longitudinal median line of the shoe, and assuming a similar angular relation to the arm at its opposite side in the continued movement of the parts beyond said position. In other words, the plate 348 and its supported parts are maintained in a substantially uniform angular relation to the adjacent lateral periphery of the shoe throughout the movement of the device round the shoe, notwithstanding the difference in curvature between the edge of the shoe bottom and the circular path of movement of the support 340.

It is after the binder wire has been drawn firmly round the end of the shoe under the wipers by the action of the binder applying device that the tacking and bending mechanism at the right hand side of the shoe is moved inwardly to its operative position, as hereinbefore explained, and is operated to drive the tack and to grip the wire and twist its end round the tack. By reference to Fig. 24 it will be seen that the wire is held in such relation to the shoe at this side as to permit the gripper in its downward movement to engage it. It will be evident that before the wire can be twisted round the right hand tack the proper length of wire to form the binder must be severed from the supply on the coil. For this purpose a pair of shear blades 406 are provided, one of these blades being fast on the right hand slide 186 and the other pivoted on a bracket on the slide and carrying a roll 408 for engagement with the periphery of the cam wheel 240. A spring 410 operates to hold the roll against the wheel and intially to open the shear blades, as indicated in Fig. 11. It is while the shear blades are thus in open relation that the slide 186 is moved inwardly and the blades are caused to embrace the wire a sufficient distance at the rear of the gripper jaws to provide the proper length of wire to be twisted round the tack. Immediately after the gripper has been moved downwardly and closed on the wire, a shoulder 412 on the wheel 240 operates upon the roll 408 to swing the pivoted shear blade and cut the wire. The gripper is then raised sufficiently to permit it to clear the shear blades and the bottom of the shoe in the manner already fully explained, and is turned to twist the wire round the tack, the gripper in its first rearward movement round the tack serving to pull the wire inwardly at the side of the shoe and to tighten it rearwardly, as will be evident by reference to Fig. 24. After the twisting operation has been completed, the gripper is further elevated and is opened to release the wire in the same manner as the gripper which operates at the left-hand side of the shoe.

Figure 24:
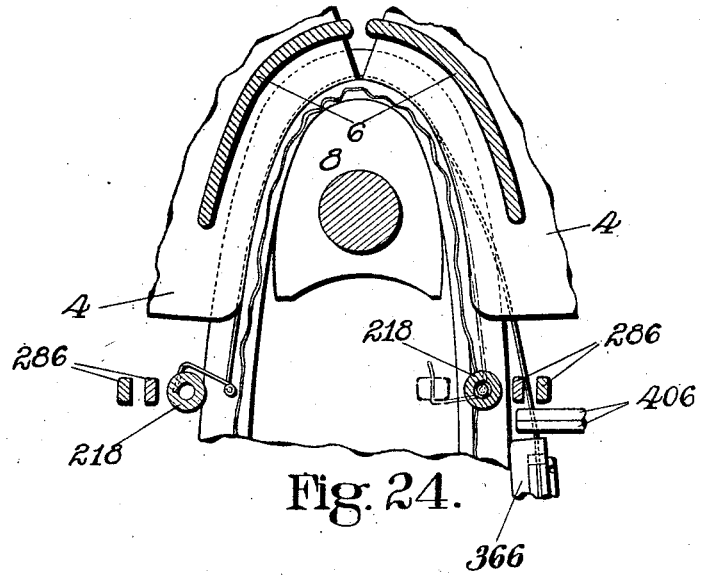

By reference to Fig. 9 it will be seen that after the wire bending operation at the left-hand side of the shoe has been completed, the cam 204 causes a partial retractive movement of the slide 186 and its supported tacking and bending mechanism at this side of the shoe to position this mechanism substantially as indicated at the left-hand side of Fig. 24, this retractive movement, however, being sufficiently short to permit the lug 386 on the wire holding means to be carried again into operative relation to the depending lug 384 on the slide 186 when the binder applying device receives its reverse movement round the shoe. After the bending operation at the right-hand side of the shoe has been completed, the slide 186 at that side is moved outwardly by the action of its cam 206, and immediately thereafter the binder applying device is moved reversely round the shoe by the action of the peripheral cam 394. The cam 204 then serves to complete the outward movement of the slide 186 at the left-hand side of the shoe and by this movement the wire guiding slide 366 is also moved outwardly to its starting position by the action of the lug 384 on the lug 386. It will also be understood that after the binder wire has been fastened to the shoe at the right-hand side the various parts of the lasting mechanism, including the wipers, the holddown, the clamp members and the toe rest, are returned to their starting positions and the shoe is released.

Since the manner in which the various mechanisms perform their functions, and the sequence of the various operations, have been fully set forth in the foregoing description of the organization of the machine, no further detailed description of the operation is necessary for an understanding of the invention. It is to be noted, however, with reference to the manually effected positioning movement of the wipers, the holddown and the clamping device, that after these parts have been advanced and positioned in the correct relation to a shoe by movement of the hand lever 124 they are held effectively in such position by the automatic action of the internally threaded pinion 104 and of the roll 158 in the slot 156 and that the power driving means returns the parts to this position after the operations on the shoe have been completed. Manual movement of the lever 124 to close the wipers round every shoe of a given size and style and to position the holddown and the clamping device relatively to the shoe is therefore unnecessary, and after the parts have been once positioned manually in proper relation to a shoe all that the operator is required to do in presenting successive shoes of the same size and style is to press the toe end of the shoe inwardly against the wipers which are held in proper position to engage and embrace the end of the shoe. From the starting position determined by manipulation of the lever 124 the wipers have a positive movement of predetermined extent inwardly over the shoe, the extent of such movement being adjustable in the manner already explained.

While the invention is herein illustrated by reference to a machine in which the mechanism for driving the tacks to which the ends of the binder are secured is adapted to utilize string tacks, it is to be understood that in many of its aspects the invention is not limited to the use of tacking means of this particular character, and it is also to be understood that the term "tack", except where otherwise required by the context, is used herein in a generic sense and not as restrictive to any particular form of fastener. It will be understood also that in numerous respects variations in the details of construction are contemplated within the spirit and scope of the appended claims.

Having described the invention, what we claim as new and desire to secure by Letters Patent of the United States is:

1. In a machine of the class described, the combination with means for working an upper over a last, of means for driving anchor tacks at the opposite sides of the shoe, and means for applying a binder round the end of the shoe and for bending it round said tacks at the opposite sides of the shoe successively.

2. In a machine of the class described, the combination with means for working an upper over a last, of means for driving anchor tacks at the opposite sides of the shoe, and means for drawing a binder progressively round the end of the shoe from one side to the other and for bending it round said different tacks.

3. In a machine of the class described, the combination with means for working an upper over a last, of means for driving anchor tacks at the opposite sides of the shoe, means movable round the end of the shoe from one side to the other to apply a binder to the shoe, and means for fastening the binder to said tacks.

4. In a machine of the class described, the combination with means for working an upper into lasted position round the end of a last, of means automatically operative in time relation to said first named means to apply a binder round the end of the shoe and to fasten it at the opposite sides of the shoe successively.

5. In a machine of the class described, the combination with means for working an upper over a last, of means for applying a binder round the end of the shoe, and means for driving anchor tacks at the opposite sides of the shoe successively and for bending the binder round said tacks.

6. In a machine of the class described, the combination with means for working an upper over a last, of power operated means for drawing a binder progressively round the end of the shoe from one side to the other, and means automatically operative in time relation to said last named means to fasten the binder at the opposite sides of the shoe successively.

7. In a machine of the class described, the combination with means for working an upper into lasted position round the end of a last, of means for driving anchor tacks at the opposite sides of the shoe and for bending a lasting binder round said tacks first at one side of the shoe and then at the other to hold the binder in place.

8. In a machine of the class described, the combination with means for working an upper over a last, of means for driving anchor tacks at the opposite sides of the shoe, a device for positioning a binder relatively to the shoe, and power operated bending mechanism arranged to engage the ends of the binder and having a cycle of movements in time relation to bend said ends round the anchor tacks first at one side of the shoe and then at the other.

9. In a machine of the class described, the combination with means for working an upper over a last, of means for driving anchor tacks at the opposite sides of the shoe, a binder applying device, mechanism for operating said device to draw a binder progressively round the end of the shoe from one side to the other, and bending mechanism arranged to engage the ends of the binder and having a cycle of movements in time relation to bend said ends round the anchor tacks first at one side of the shoe and then at the other.

10. In a machine of the class described, the combination with means for working an upped over a last, of means for driving anchor tacks at the opposite sides of the shoe, a binder guiding device mounted for movement round the end of the shoe from one side to the other to apply a binder to the shoe, and fastening mechanism movable to secure the binder to the anchor tacks.

11. In a machine of the class described, the combination with means for working an upper over a last, of means for driving anchor tacks at the opposite sides of the shoe, a binder applying device mounted for movement round the end of the shoe from one side to the other to apply a binder to the shoe, bending mechanism, a power shaft, and connections between the power shaft and said binder applying device and bending mechanism for operating them to apply the binder to the shoe and to bend it round the anchor tacks.

12. In a machine of the class described, the combination with means for working an upper over a last, of means for driving anchor tacks at the opposite sides of the shoe, a binder applying device mounted for movement round the end of the shoe from one side to the other to apply a binder to the shoe, and power operated bending mechanism arranged to engage the ends of the binder and having a cycle of movements in time relation to bend said ends round the anchor tacks first at one side of the shoe and then at the other.

13. In a machine of the class described, the combination with means for working an upper over a last, of a binder applying device mounted for movement round the end of the shoe from one side to the other to apply a binder to the shoe, and fastening mechanism automatically operative in time relation to said binder applying device to fasten the opposite ends of the binder to the shoe.

14. In a machine of the class described, the combination with means for working an upper over a last, of a device mounted for movement round the end of the shoe from one side to the other to apply a binder to the shoe, bending mechanism, and power means for operating said bending mechanism to bend the ends of the binder round anchor tacks at the opposite sides of the shoe.

15. In a machine of the class described, the combination with means for working an upper over a last, of a binder guiding device mounted for movement round the end of the shoe from one side to the other to apply a binder to the shoe, binder fastening mechanism, a power shaft, and connections between the power shaft and said fastening mechanism for operating said mechanism to fasten the binder at the opposite sides of the shoe successively.

16. In a machine of the class described, the combination with means for working an upper over a last, of fastening mechanism arranged to engage a lasting binder at the opposite sides of the shoe, and power operated connections for imparting to said mechanism operative movements to fasten the binder to the shoe first at one side of the shoe and then at the other.

17. In a machine of the class described, the combination with means for working an upper over a last, of means for driving anchor tacks at the opposite sides of the shoe, and fastening mechanism arranged to engage a lasting binder at the opposite sides of the shoe and having a cycle of movements to bend the ends of the binder and secure it to said tacks at the opposite sides of the shoe successively.

18. In a machine of the class described, the combination with means for working an upper over a last, of tacker mechanism, power operated connections to said mechanism for operating it to drive anchor tacks first at one side of the shoe and then at the other, and additional power operated means for applying a binder to the shoe and for bending its ends round said tacks.

19. In a machine of the class described, the combination with means for working an upper over a last, of tacker mechanism, power operated connections to said mechanism for operating it to drive anchor tacks first at one side of the shoe and then at the other, a binder applying device mounted for movement round the end of the shoe, bending mechanism, and power operated connections to said binder applying device and bending mechanism for operating them in time relation to the tacker mechanism to apply a binder to the shoe and to bend its ends round said tacks.

20. In a machine of the class described, the combination with means for working an upper over a last and for holding it in lasted position at the opposite sides of the shoe simultaneously, of means for applying a binder round the end of the shoe, and means for fastening the binder to anchor tacks at the opposite sides of the shoe successively.

21. In a machine of the class described, the combination with means for working an upper over a last and for holding it in lasted position at the opposite sides of the shoe simultaneously, of means for driving anchor tacks at the opposite sides of the shoe, means for drawing a binder progressively round the end of the shoe from one side to the other while the upper is thus held, and means for fastening the binder to said tacks first at one side of the shoe and then at the other.

22. In a machine of the class described, the combination with end embracing wipers and means for operating them to work an upper into lasted position round the end of a shoe, of means for drawing a binder progressively round the end of the shoe from one side to the other to hold the upper in lasted position, and means for fastening said binder to the shoe at the opposite sides of the shoe.

23. In a machine of the class described, the combination with end embracing wipers and power means for operating them to work an upper into lasted position round the end of a shoe, of means automatically operative in time relation to said wipers to apply a binder subsequently round the end of the shoe and to fasten it to anchor tacks at the opposite sides of the shoe.

24. In a machine of the class described, the combination with end embracing wipers and power means for operating them to work an upper into lasted position round the end of a shoe, of means automatically operative in time relation to said wipers to drive anchor tacks at the opposite sides of the shoe and to apply a binder round the end of the shoe and to fasten it to said tacks first at one side of the shoe and then at the other.

25. In a machine of the class described, the combination with end embracing wipers and means for operating them to work an upper into lasted position round the end of a shoe, of a device mounted for movement round the end of the shoe to force a binder in between the wipers and the shoe, and additional devices for connecting the ends of the binder to the shoe.

26. In a machine of the class described, the combination with end embracing wipers and means for operating them to work an upper into lasted position round the end of a shoe, of a binder applying device mounted for movement round the end of the shoe to force a binder in between the wipers and the shoe, devices for driving anchor tacks at the opposite sides of the shoe and for bending the ends of the binder round said tacks, and power means for operating the binder applying device and the tacking and bending devices in time relation.

27. In a machine of the class described, the combination with end embracing wipers and means for operating them to work an upper into lasted position round the end of a shoe, of means for applying a binder round the end of the shoe, tacking and bending devices at the opposite sides of the shoe, power driving means, and connections between the driving means and said devices for operating them to drive a tack and bend an end of the binder round it at one side of the shoe and subsequently to drive a tack and bend an end of the binder round it at the opposite side of the shoe.

28. In a machine of the class described, the combination with end embracing wipers and power driving means connected to said wipers for operating them to work an upper into lasted position round the end of a shoe, of a device mounted for movement round the end of the shoe to apply a binder to the shoe, tacking and bending devices at the opposite sides of the shoe, and connections between the driving means and said different devices for operating them to apply a binder to the shoe and to fasten it to anchor tacks at the opposite sides of the shoe successively.

29. In a machine of the class described, the combination with means for holding a shoe substantially stationary, of means for applying a binder round the end of the shoe, and additional means constructed and arranged to bend the ends of the binder and fasten them to tacks at the opposite sides of the shoe successively.

30. In a machine of the class described, the combination with shoe positioning means, of means movable progressively round the end of the shoe from one side to the other in a predetermined path to apply a binder to the shoe, and additional means for fastening the binder to the shoe.

31. In a machine of the class described, the combination with shoe positioning means, of a device mounted for movement progressively round the end of the shoe from one side to the other to apply a binder to the shoe, mechanism for driving tacks at the opposite sides of the shoe, and additional mechanism for anchoring the ends of the binder to said tacks.

32. In a machine of the class described, the combination with shoe positioning means, of a device for driving an anchor tack at one side of the shoe and for bending a binder round said tack, a binder applying device, means for moving said binder applying device round the end of the shoe to draw a binder round the shoe, and another device for driving a tack and for bending the binder round it at the opposite side of the shoe.

33. In a machine of the class described, the combination with shoe positioning means, of tackers and means for operating them to drive anchor tacks at the opposite sides of the shoe, a binder applying device mounted for movement round the end of the shoe from one side to the other to apply a binder to the shoe, and devices at the opposite sides of the shoe movable to bend the ends of the binder round said tacks.

34. In a machine of the class described, the combination with shoe positioning means, of tackers for driving anchor tacks at the opposite sides of the shoe, devices associated with said tackers for bending the ends of a binder round the tacks, a binder applying device mounted for movement round the end of the shoe and arranged to position a binder in operative relation to said bending devices, power driving means, and connections between said driving means and the tackers and binders applying and bending devices for operating them in time relation.

35. In a machine of the class described, the combination with shoe positioning means, of a pair of fastening devices mounted for movement toward and from the opposite sides of the shoe respectively, and controlling means to cause the fastening device at one side of the shoe to move into operative relation to the shoe first and then the fastening devices at the other side of the shoe to move into operative relation to the shoe.

36. In a machine of the class described, the combination with shoe positioning means, of a pair of fastening devices mounted for movement toward and from the opposite sides of the shoe respectively, spring means for moving said devices inwardly toward the shoe, and cam means for controlling the inward movements of said devices to cause first one of them and then the other to move into operative relation to the shoe.

37. In a machine of the class described, the combination with shoe positioning means, of a pair of tackers mounted for movement toward and from the opposite sides of the shoe respectively, controlling means to cause first one and then the other of said tackers to move into operative relation to the shoe, power driving means, and connections between said driving means and the tackers for operating them to drive tacks at the opposite sides of the shoe successively.

38. In a machine of the class described, the combination with shoe positioning means, of a pair of tackers mounted for movement toward and from the opposite sides of the shoe respectively, spring means for moving said tackers inwardly toward the shoe, power driven cam means for releasing said tackers to the action of said spring means first at one side of the shoe and then at the other, and power means for operating said tackers to drive the tacks at the opposite sides of the shoe successively.

39. In a machine of the class described, the combination with shoe positioning means, of tacking and bending devices mounted for movement toward and from the opposite sides of the shoe respectively, controlling means to cause said devices to move into operative relation to the shoe first at one side of the shoe and then at the other, a device mounted for movement round the end of the shoe to apply a binder and position it for the action of the bending devices to bend its ends round the driven tacks, and power operated means for moving said binder applying device round the end of the shoe in time relation to the inward movements of the tacking and bending devices.

40. In a machine of the class described, the combination with shoe positioning means, of tacking and bending devices mounted for movement toward and from the opposite sides of the shoe respectively, a device mounted for movement round the end of the shoe to apply a binder to the shoe and position it for its ends to be bent round tacks by the action of said tacking and bending devices, power operated means for moving one of said tacking and bending devices into operative relation to the shoe prior to the movement of said binder applying device round the shoe, and additional power operated means for moving the other tacking and bending device into operative relation to the shoe after the binder has been applied round the end of the shoe.

41. In a machine of the class described, the combination with shoe positioning means, of devices at the opposite sides of the shoe for bending the ends of a binder round tacks in the shoe, a driving member, connections including clutches between said member and the different respective bending devices, and automatically operative controlling means to actuate first one of said clutches and then the other to connect the different bending devices successively to said driving member.

42. In a machine of the class described, the combination with shoe positioning means, of a pair of tacking and bending devices positioned respectively at the opposite sides of the shoe and each including a pair of gripper jaws relatively movable to grip an end of a binder and movable together to bend the binder round a partially driven tack.

43. In a machine of the class described, the combination with shoe positioning means, of a pair of tacking and bending devices positioned respectively at the opposite sides of the shoe and each including a pair of gripper jaws relatively movable to grip an end of a binder and movable together to bend the binder round a partially driven tack, a binder applying device mounted for movement round the end of the shoe to apply a binder to the shoe and position the ends of the binder for the action of the different pairs of gripper jaws, and power operated connections for imparting movements to said gripper jaws to grip the binder and bend it round a tack first at one side of the shoe and then at the other side of the shoe.

44. In a machine of the class described, the combination with shoe positioning means, of means movable round the end of the shoe from one side to the other for applying binder material to the shoe, and means for severing a portion of said material and for fastening it to the shoe.

45. In a machine of the class described, the combination with shoe positioning means, of a device mounted for movement round the end of the shoe from one side to the other for applying binder material to the shoe, a cutter, power means for operating said cutter to sever a portion of said material, and additional power-operated means for fastening the binder to the shoe.

46. In a machine of the class described, the combination with shoe positioning means, of means for positioning binder material round the end of the shoe, bending devices positioned respectively at the opposite sides of the shoe for bending the ends of a binder round partially driven tacks, a cutter associated with one of said bending devices, and power means for operating said cutter to sever a portion of the binder material prior to the bending movement of the associated bending device.

47. In a machine of the class described, the combination with shoe positioning means, of means for positioning binder material round the end of the shoe, a tacking and bending device mounted independently of said binder positioning means for movement toward the shoe, a cutter carried by said device, and power-driven connections for operating said cutter to sever a portion of the binder material and for operating said tacking and bending device to drive a tack and to bend the end of the binder round it.

48. In a machine of the class described, the combination with shoe positioning means, of a binder applying device mounted for movement round the end of the shoe to apply binder material to the shoe, a cutter at one side of the shoe in relation to which the binder material is positioned by the action of said binder applying device, and means for imparting operative movement to said cutter to sever a portion of the binder material.

49. In a machine of the class described, the combination with shoe positioning means, of a binder applying device mounted for movement round the end of the shoe to apply binder material to the shoe, a pair of tacking and bending devices mounted for movement toward and from the opposite sides of the shoe respectively, power operated means for moving said devices into operative relation to the shoe first at one side of the shoe and then at the other, a cutter associated with that tacking and bending device which is last moved into operative relation to the shoe, and additional power means for operating said cutter to sever a portion of the binder material.

50. In a machine of the class described, the combination with work positioning means, of a holder for a coil of binder material, said holder being mounted for movement round the work in a predetermined path to apply a binder to the work.

51. In a machine of the class described, the combination with shoe positioning means, of a holder for a coil of binder material, automatically controlled means for moving said holder round the end of the shoe to apply a binder to the shoe, and means for fastening the binder to the shoe.

52. In a machine of the class described, the combination with shoe positioning means, of a holder for a coil of binder material, means for moving said holder round the end of the shoe to apply a binder to the shoe, and means for driving tacks at the opposite sides of the shoe and for fastening the binder to said tacks.

53. In a machine of the class described, the combination with shoe positioning means, of a holder for a coil of binder material, said holder being mounted for movement round the end of the shoe to apply a binder to the shoe, devices for driving tacks at the opposite sides of the shoe and for bending the ends of the binder round said tacks, a driving member, and connections between the driving member and said holder and tacking and bending devices for operating them in time relation.

54. In a machine of the class described, the combination with shoe positioning means, of a holder for a coil of binder material, means for moving said holder round the end of the shoe to draw a binder round the shoe, and means for severing the binder from the coil of material.

55. In a machine of the class described, the combination with shoe positioning means, of a holder for a coil of binder material, said holder being mounted for movement round the end of the shoe to apply a binder to the shoe, a cutter adjacent to one side of the shoe, power driving means, and operating connections between the driving means and said holder and cutter for operating them to apply a binder round the end of the shoe and to sever the binder from the coil of material.

56. In a machine of the class described, the combination with shoe positioning means, of a holder for a coil of binder material, said holder being mounted for movement round the end of the shoe to apply a binder to the shoe, tacking and bending devices at the opposite sides of the shoe, a cutter at one side of the shoe, power driving means, and operating connections between the driving means and said holder and tacking and bending devices and cutter for operating them in time relation.

57. In a machine of the class described, the combination with shoe positioning means, of a holder for a coil of binder material, said holder being mounted for movement to carry the coil of material round the end of the shoe to apply a binder to the shoe, and a device on said holder for guiding the binder along the edge of the shoe bottom.

58. In a machine of the class described, the combination with shoe positioning means, of a holder for a coil of binder material, said holder being mounted for movement round the end of the shoe to apply a binder to the shoe, a guide for the binder material movably mounted on said holder, and spring means for pressing said guide inwardly toward the shoe.

59. In a machine of the class described, the combination with shoe positioning means, of a holder for a coil of binder material, said holder being mounted for movement round the end of the shoe to apply a binder to the shoe, a guide for the binder material movably mounted on said holder, spring means for pressing said guide inwardly toward the shoe, and a device for adjusting the limit of inward movement of said guide.

60. In a machine of the class described, the combination with shoe positioning means, of a binder applying device mounted for movement round the end of the shoe and comprising a guide movable toward and from the shoe, spring means for pressing said guide toward the shoe, and means automatically operative to vary the distance between said guide and the shoe during the movement of the device round the shoe.

61. In a machine of the class described, the combination with shoe positioning means, of a binder applying device comprising a guide for binder material mounted for movement round the end of the shoe from a position of substantial engagement with the shoe at one side to a position of substantial engagement with the shoe at the other side, and means automatically operative in said movement of the guide to position it out of engagement with the shoe as it moves round the end face of the shoe.

62. In a machine of the class described, the combination with shoe positioning means, of a binder applying device, a support mounted for swinging movement to carry said device round the end of the shoe and on which said device is movably mounted, and guiding means for directing said device in a predetermined path during the movement of said support.

63. In a machine of the class described, the combination with shoe positioning means, of a binder applying device, a support movable to carry said device round the end of the shoe and on which said device is movable outwardly and inwardly, and guiding means for imparting outward and inward movements to said device as it travels round the shoe.

64. In a machine of the class described, the combination with shoe positioning means, of a binder applying device, a support movable to carry said device round the end of the shoe and provided with a guideway along which said device is movable outwardly and inwardly relatively to the shoe, a fixed guide, and means on said device for engaging said guide to determine the position of the device on said support as it travels round the end of the shoe.

65. In a machine of the class described, the combination with shoe positioning means, of a binder applying device, a support for said device mounted to swing about an axis at the rear of the toe end face of the shoe and upon which the device is mounted for movement toward or from said axis, and a guide co-operating with said device to vary its relation to said axis and to direct it substantially along the edge of the shoe bottom as it is carried round the end of the shoe by the swinging support.

66. In a machine of the class described, the combination with shoe positioning means, of a binder applying device, a support movable to carry said device round the end of the shoe and on which said device is movable outwardly and inwardly relatively to the shoe, and guiding means constructed to impart an outward movement to the device and to hold it out of engagement with the shoe as it travels round the end face of the shoe and subsequently to move the device inwardly toward the shoe.

67. In a machine of the class described, the combination with shoe positioning means, of a binder applying device, a support movable to carry said device round the end of the shoe, and means automatically operative to dispose said device in different angular relations to the support as the device moves round the end of the shoe.

68. In a machine of the class described, the combination with shoe positioning means, of a binder applying device mounted for movement round the end of the shoe and including a guide to direct the binder along the edge of the shoe bottom, and means automatically operative in the movement of the device round the shoe to impart to the device additional movements for maintaining said guide in substantially uniform angular relation to the edge of the shoe bottom.

69. In a machine of the class described, the combination with shoe positioning means, of a binder applying device, a support mounted to swing about an axis intersecting the shoe to carry the device round the end of the shoe and upon which the device is mounted to swing about an axis parallel to said first axis, and guiding means for controlling swinging movements of the device about said last named axis as the device is carried round the end of the shoe.

70. In a machine of the class described, the combination with shoe positioning means, of a binder applying device, a support for said device movable to carry the device round the end of the shoe and upon which said device is mounted to swing about an axis transverse to the plane of the shoe bottom, and guiding means to cause a relative swinging movement between said device and support first in one direction and then in the other as it travels round the shoe.

71. In a machine of the class described, the combination with shoe positioning means, of a binder applying device, a support mounted to swing about an axis transverse to the plane of the shoe bottom to carry said device round the end of the shoe and upon which the device is movably mounted, and guiding means for determining the angular relation of the device to the shoe irrespective of the path of movement of the support.

72. In a machine of the class described, the combination with shoe positioning means, of a binder applying device, a support movable to carry said device round the end of the shoe and upon which the device is movably mounted, and means for controlling movement of the device relatively to the support to determine both the distance between said device and the shoe and the angular relation of the device to the edge of the shoe bottom as it travels round the shoe.

73. In a machine of the class described, the combination with shoe positioning means, of a binder applying device, a support mounted for swinging movement about an axis to carry said device round the end of the shoe, the device being mounted for movement toward and from said axis and also for angular swinging movement about a different axis, and guiding means automatically operative to control said different movements of the device relatively to the support as the device is carried round the end of the shoe.

74. In a machine of the class described, the combination with shoe positioning means, of a binder applying device, a support mounted for swinging movement to carry said device round the end of the shoe, the device being mounted on said support for bodily outward and inward movements relatively to the shoe and also for lateral swinging movements, and means comprising a fixed guide and a co-operating part on said device for controlling said different movements of the device as it travels round the shoe.

75. In a machine of the class described, the combination with a toe post for supporting the forepart of a shoe, of a binder applying device mounted to swing about said toe post as an axis to apply a binder round the end of the shoe.

76. In a machine of the class described, the combination with a toe post for suporting the forepart of a shoe, of a binder applying device, a support mounted to swing about said toe post as an axis to carry the device round the end of the shoe and upon which said device is movably mounted, and means comprising a fixed guide and a co-operating part on said device for imparting to the device movement relatively to said support as it travels round the shoe.

77. In a machine of the class described, the combination with shoe positioning means, of a binder fastening device mounted for movement inwardly toward the side of the shoe, a device for guiding a binder round the end of the shoe, spring means for pressing said guiding device inwardly toward the shoe, and means on said fastening device for holding said guiding device initially in a retracted position and for controlling its inward movement by the action of said spring means.

78. In a machine of the class described, the combination with shoe positioning means, of a binder fastening device mounted for movements toward and from the shoe, a binder applying device comprising a guide for binder material mounted for movement round the end of the shoe, said guide being mounted for movements also toward and from the shoe, spring means for moving the guide toward the shoe, and means on said fastening device for moving the guide outwardly from the shoe and for controlling its inward movement.

79. In a machine of the class described, the combination with shoe positioning means, of a tacking and bending device mounted for movement toward and from the shoe, a holder for binder material also movable toward and from the shoe and arranged to present an end of said material in position to be engaged by said tacking and bending device, and means on the tacking and bending device for controlling the movement of said holder.

80. In a machine of the class described, the combination with work positioning means, of means for bending an end of binder material round a tack in the work, said bending means comprising a pair of jaws relatively movable to grip the material and mounted for movement together round the tack to bend the material.

81. In a machine of the class described, the combination with shoe positioning means, of means for positioning binder material adjacent to the shoe, and means for bending an end of said material round a tack in the shoe, said bending means comprising a pair of gripper jaws mounted for swinging movement round the tack, and a device for closing said jaws on the binder material.

82. In a machine of the class described, the combination with shoe positioning means, of means for positioning binder material adjacent to the shoe, and means for bending an end of said material round a tack in the shoe, said bending means comprising a pair of gripper jaws mounted for movement toward the binder material, and a device operated by said movement of the jaws to close them on the material.

83. In a machine of the class described, the combination with shoe positioning means, of means for positioning binder material adjacent to the shoe, and means for bending an end of said material round a tack in the shoe, said bending means comprising a pair of gripper jaws mounted for movement toward the binder material, a cam member for closing said jaws and for holding them closed on the material, and an abutment into engagement with which said member is carried by the movement of the jaws to operate it for closing the jaws.

84. In a machine of the class described, the combination with shoe positioning means, of means for positioning binder material adjacent to the shoe, and means for bending an end of said material round a tack in the shoe, said bending means comprising a pair of gripper jaws mounted for movement toward the binder material, means for closing said jaws on the material, and power-driven connections for moving said jaws toward the material to grip it and for then moving them reversely to position the binder material relatively to the shoe bottom and for swinging them to bend said material round a tack.

85. In a machine of the class described, the combination with shoe positioning means, of means for positioning binder material at the side of the shoe, a device for gripping said material, and means for moving said device to position the binder material relatively to the plane of the shoe bottom and for then swinging it to bend the material round a tack in the shoe.

86. In a machine of the class described, the combination with shoe positioning means, of means for positioning binder material adjacent to the shoe, and means for bending an end of said material round a tack in the shoe, said bending means comprising a pair of gripper jaws mounted for movement toward and from the binder material, a cam device carried by said jaws and movable for closing and opening the jaws, and relatively stationary parts arranged for engagement with said device to close and open the jaws respectively in the movements of the gripper in opposite directions.

87. In a machine of the class described, the combination with shoe positioning means, of means for positioning binder material adjacent to the shoe, and means for bending an end of said material round a tack in the shoe, said bending means comprising a pair of gripper jaws mounted for movement toward the material to grip it and also for swinging movement to bend the material round a tack, power driving means, and separate connections between the driving means and the bending means for imparting to the jaws their gripping and bending movements.

88. In a machine of the class described, the combination with shoe positioning means, of a device mounted for turning movement to bend an end of binder material round a tack in the shoe, power driven mechanism including a clutch for operating said device, and power driven cam means for controlling said clutch.

89. In a machine of the class described, the combination with shoe positioning means, of means for positioning binder material adjacent to the shoe, and means for bending an end of said material round a tack in the shoe, said bending means comprising a pair of gripper jaws mounted for movement toward the material to grip it and also for swinging movement to bend the material round a tack, power driving means, connections between said driving means and bending means for imparting to the jaws their gripping and bending movements, said connections including clutches movable to initiate and to stop said movements, and power driven means for actuating said clutches to time the movements.

90. In a machine of the class described, a device for engaging an end of binder material, said device being mounted for turning movement to bend the material round a tack, and operating mechanism connected to said device to turn it positively a plurality of times round the tack.

91. In a machine of the class described, the combination with shoe positioning means, of means for positioning binder material adjacent to the shoe, and means for gripping an end of said material and bending it a plurality of times round a tack in the shoe.

92. In a machine of the class described, the combination with shoe positioning means, of a device mounted for turning movement to bend an end of binder material round a tack in the shoe, power driving means, and positive connections between said driving means and the bending device for turning it a plurality of times round the tack.

93. In a machine of the class described, the combination with shoe positioning means, of a device mounted for turning movement to bend an end of binder material round a tack in the shoe, power driven mechanism including a clutch for operating said device, and automatic means for controlling said clutch to cause the device to bend the material a plurality of times round the tack.

94. In a machine of the class described, the combination with shoe positioning means, of means for positioning binder material adjacent to the shoe, and a gripper comprising a pair of jaws relatively movable to grip an end of said material and movable also to bend the material round a tack in the shoe, said jaws being movable in such relation to the binder positioning means as to bend the material partially round the jaws for increasing their effective grip upon it.

95. In a machine of the class described, the combination with shoe positioning means, of means for fastening a binder to hold the upper round an end of the shoe comprising a gripper for gripping an end of binder material and bending it round a tack at one side of the shoe, said gripper being mounted to swing initially round that side of the tack which is farthest from the end of the shoe for tightening the binder on the shoe.

96. In a machine of the class described, the combination with shoe positioning means, of means for applying a binder round the end of the shoe, grippers at opposite sides of the shoe for gripping the ends of the binder and bending them round tacks in the shoe, and power-driven connections for imparting to said grippers swinging movements directed initially round the rear of the tacks for tightening the binder lengthwise of the shoe.

97. In a machine of the class described, the combination with shoe positioning means, of means for applying a binder round the end of the shoe, grippers for engaging the ends of said binder adjacent to the sides of the shoe and for bending them round tacks in the shoe, and power-driven connections for swinging said grippers inwardly over the shoe round the rear of the tacks to carry the binder inwardly at the sides and to tighten it lengthwise of the shoe.

98. In mechanism of the class described, a device for engaging an end of binder material and bending it round a tack, the binder engaging portion of said device being mounted for movement round the tack and also for movement inwardly toward the tack during the bending operation.

99. In a machine of the class described, the combination with work positioning means, of a device for bending an end of binder material round a tack in the work, said device comprising a gripper mounted for movement round the tack and for movement also inwardly toward the tack in response to the pull of the binder in the bending operation, and spring means against the force of which said gripper is inwardly movable.

100. In a machine of the class described, the combination with work positioning means, of a device for bending an end of binder material round a tack in the work, said device comprising a pair of gripper jaws mounted for movement round the tack, said jaws being relatively movable to grip the material and mounted to swing inwardly together toward the tack in response to the pull of the material in the bending operation, and spring means for opposing yielding resistance to the inward swinging movement of the jaws.

101. In mechanism of the class described, a tacking and bending device comprising tack driving means and a gripper, said gripper comprising jaws relatively movable to grip an end of binder material and also movable to bend the material round a tack.

102. In mechanism of the class described, the combination with a tacker for partially driving a tack, of a gripper associated with said tacker and movable to bend binder material round the tack, and power means for operating said tacker and gripper.

103. In mechanism of the class described, a tacker comprising a tack guiding stem and a sleeve encircling said stem, said sleeve being mounted for turning movement, and a gripper carried by said sleeve for engaging an end of binder material and bending it round a tack.

104. In mechanism of the class described, a tacker comprising a tack guiding stem and a sleeve encircling said stem, a tack driving device mounted on said sleeve, means for moving said sleeve and driving device lengthwise of the stem for partially driving a tack, a gripper also mounted on said sleeve for engaging an end of binder material, and means for imparting turning movement to the sleeve to cause the gripper to bend said material round the tack.

105. In mechanism of the class described, a tacker comprising a tack guiding stem, a sleeve encircling said stem, a tack driving device mounted on said sleeve, means for moving said sleeve and driving device lengthwise of the stem for driving a tack, a gripper comprising relatively movable jaws mounted on said sleeve for gripping an end of binder material, a device carried on said jaws for closing them on the material, an abutment on said stem into engagement with which said closing device is carried by the movement of the sleeve, and means for imparting turning movement to said sleeve to cause the gripper to bend the binder material round the tack.

106. In mechanism of the class described, a tacker comprising a guide for a tack string, a sleeve encircling said guide, a pair of tack drivers mounted on said sleeve to close over the head of a tack and drive it, means for moving said sleeve lengthwise of the guide to impart driving movement to the drivers, a gripper also mounted on said sleeve for engaging an end of binder material, and means for turning said sleeve together with the drivers and the gripper to cause the gripper to bend the material round the tack.

107. In a machine of the class described, the combination with shoe positioning means, of a tacker comprising a device movable toward the shoe for partially driving a tack in the shoe, a gripper comprising a pair of jaws movable with said driving device, means for positioning binder material in the path of movement of the gripper, and means operated by movement of said driving device and gripper for closing the jaws on the binder material.

108. In a machine of the class described, the combination with shoe positioning means, of a tacker comprising a tack guiding stem, a tack guiding nozzle positioned at the end of said stem and movable relatively to the stem toward the shoe in the tack driving operation, a driving device associated with said nozzle, means for positioning an end of binder material adjacent to the shoe, a gripper movable with said nozzle to grip the binder material, and means for moving the gripper to bend the binder material round the tack.

109. In a machine of the class described, the combination with shoe positioning means, of a tacker comprising a driving device and a guiding nozzle movable together toward the shoe for partially driving a tack, means for positioning binder material adjacent to the shoe, a gripper movable with said nozzle to grip the material, and means for partially retracting said nozzle together with the gripper after the tack driving operation and for then swinging the gripper to bend the binder material round the tack.

110. In mechanism of the class described, a tacker including a device for supporting the head portion of a partially driven tack against lateral movement, and a bending device mounted for movement to bend an end of binder material round the tack while it is thus supported.

111. In a machine of the class described, the combination with shoe positioning means, of a tacker comprising a driving device and a guiding nozzle movable toward the shoe for partially driving a tack in the shoe, operating mechanism constructed to move said driving device and nozzle toward the shoe and then to move said parts reversely and to maintain the nozzle in position to support the head of the tack against lateral movement, and a bending device mounted for movement to bend a binder round the tack while it is thus supported.

112. In a machine of the class described, the combination with shoe positioning means, of a tacker comprising a tack guiding stem, a sleeve encircling said stem, a driving device carried by said sleeve, a gripper for binder material also carried by said sleeve, power driving means, connections between said driving means and sleeve for moving it lengthwise of said stem to drive a tack, and additional connections between the driving means and said stem and sleeve for turning them together to cause the gripper to bend the binder material round the tack.

113. In mechanism of the class described, a device mounted for movement for partially driving a tack, a bending device movable to bend an end of binder material round the tack, power driven connections including clutches through which movements are imparted to the tack driving and bending devices, and automatically operative controlling means for said clutches to time the bending and tack driving operations.

114. In a machine of the class described, the combination with shoe positioning means, of a device mounted for movement for partially driving a tack in the shoe, a bending device movable to bend an end of binder material round the tack, power driving means, mechanism including a clutch for connecting said driving means to the tack driving device to operate it, operating connections including a clutch between said mechanism and the bending device, and a connection between said mechanism and the last named clutch for timing the bending operation.

115. In a machine of the class described, the combination with shoe positioning means, of a pair of end embracing wipers mounted for bodily advancing movement lengthwise of a shoe and for relative closing movement laterally of the shoe, manual means for advancing and closing said wipers preliminarily round the lateral periphery of a shoe to conform them to the shoe, and power operated means for subsequently effecting relative movement of said shoe positioning means and wipers to upwipe and to overwipe the upper.

116. In a machine of the class described, the combination with shoe positioning means, of end embracing wipers, power operated means for operating said wipers to wipe the margin of an upper inwardly over the shoe bottom including parts relatively movable manually to close the wipers preliminarily round the end of the shoe, and additional power operated means for clamping the margin of the upper on the wipers and for effecting relative movement of the shoe positioning means and the wipers to stretch the clamped upper.

117. In a machine of the class described, the combination with shoe positioning means, of a pair of end embracing wipers mounted for bodily advancing movement lengthwise of a shoe, guiding means for imparting to said wipers predetermined relative closing movement laterally of the shoe in response to their advancing movement, an operating member connected to said wipers for advancing and closing them, manually operated means for imparting a preliminary movement to said member to close the wipers round the end of a shoe, and power operated means for subsequently effecting relative movement of said shoe positioning means and wipers to upwipe the upper and for imparting a further movement to said member to cause the wipers to wipe the margin of the upper inwardly over the shoe bottom.

118. In a machine of the class described, a pair of end embracing wipers mounted for bodily advancing movement lengthwise of a shoe and for closing movement laterally of the shoe in predetermined relation to their advancing movement, operating means for said wipers including parts mounted for relative movement to advance and close the wipers round the end of the shoe prior to their operation on the shoe, and a turnbuckle connecting said parts and formed as a pinion for use in effecting such preliminary movement of the wipers.

119. In a machine of the class described, a pair of end embracing wipers mounted for bodily advancing movement lengthwise of a shoe, guiding means for imparting to said wipers predetermined relative closing movement laterally of the shoe in response to their advancing movement, power driven operating connections for advancing and closing the wipers comprising rods having oppositely threaded end portions and a threaded member connecting the ends of said rods, and a manually operated member mounted independently of said threaded members and connected to said threaded member for turning it to effect a relative movement of the rods for advancing and closing the wipers round the end of a shoe prior to their overwiping movement.

120. In a machine of the class described, a pair of end embracing wipers mounted for bodily advancing movement lengthwise of a shoe and for relative closing movement laterally of the shoe, power driving means, connections between said driving means and the wipers comprising a pair of rods having oppositely threaded end portions and a pinion threaded on the ends of said rods, and a manually operated rack member connected to said pinion for turning it to effect a relative movement of the rods to advance and close the wipers round the end of a shoe prior to their overwiping movement, said pinion and rack member being constructed to permit the pinion and the rods to be moved subsequently by the power driving means for further advancing and closing the wipers.

121. In a machine of the class described, a pair of end embracing wipers mounted for bodily advancing movement lengthwise of a shoe and for relative closing movement laterally of the shoe, power driving means, connections between said driving means and the wipers for operating them, and mechanism comprising a turnbuckle and a manually operated lever connected to said turnbuckle for effecting relative movement of parts of said connections to impart a preliminary advancing and closing movement to both of said wipers prior to their power-effected movement.

122. In a machine of the class described, the combination with shoe positioning means, of a pair of end embracing wipers mounted for bodily advancing movement lengthwise of a shoe and for relative closing movement laterally of the shoe, power driving means for effecting relative movement of said shoe positioning means and wipers to upwipe the upper and for imparting to said wipers a positive advancing and closing movement of predetermined extent, and connections between said driving means and the wipers including parts relatively movable manually to position the wipers in conformity to the contour of a shoe prior to the operative movement of said power driving means, said parts being constructed to return the wipers to the position thus manually determined for the operation of the machine on each successive shoe.

123. In a machine of the class described, a pair of end embracing wipers mounted for bodily advancing movement lengthwise of a shoe and for relative closing movement laterally of the shoe, power driving means, connections between said driving means and the wipers for imparting to the wipers an advancing and closing movement of predetermined extent, said connections comprising rods mounted in alinement and relatively movable to effect a preliminary movement of the wipers to determine their starting position, and a turnbuckle for effecting such relative movement of the rods and for holding them in adjusted relation to maintain said starting position constant in the operation of the machine on a plurality of shoes.

124. In a machine of the class described, the combination with end embracing wipers and means for advancing them lengthwise of a shoe, of a device for clamping the margin of the upper on said wipers, said device being mounted independently of the wipers, and connections between said wiper advancing means and the clamping device for advancing said device with the wipers.

125. In a machine of the class described, the combination with end embracing wipers and operating means for advancing them and for closing them inwardly round the end of a shoe to adjust them preliminarily to the shoe, of a device for clamping the margin of the upper on said wipers, and additional means for advancing said clamping device with the wipers and for closing said device inwardly to maintain it in substantially uniform angular relation to the edges of the wipers.

126. In a machine of the class described, the combination with end embracing wipers mounted for bodily advancing movement lengthwise of a shoe and guiding means for imparting to the wipers predetermined relative closing movement laterally of the shoe in response to their advancing movement, of members for clamping the margin of the upper on said wipers, connections between said clamp members and the wipers for advancing said members with the wipers, and additional guiding means for effecting lateral closing movement of said members proportional to their advancing movement.

127. In a machine of the class described, the combination with end embracing wipers and operating means for advancing and closing said wipers round the end of a shoe prior to their overwiping movement, of a device for clamping the margin of the upper on said wipers, connections between the clamping device and said wiper operating means for advancing said device with the wipers, and additional operating means for subsequently moving the wipers relatively to said clamping device to wipe the margin of the upper inwardly over the the shoe bottom.

128. In a machine of the class described, the combination with end embracing wipers and power means connected to said wipers to operate them, of manual means for imparting a preliminary advancing and closing movement to said wipers to conform them to a shoe, members for engaging and clamping the margin of the upper on said wipers, and connections between said manual means and the clamp members for advancing and closing said members with the wipers.

129. In a machine of the class described, the combination with end embracing wipers and means for operating them to wipe the margin of an upper inwardly over the bottom of a last, of additional manually operated means for imparting to the wipers a preliminary advancing and closing movement to conform them to a shoe, members for clamping the margin of the upper on said wipers, and mechanism connecting said manual means to the clamp members to advance and close them inwardly with the wipers, said mechanism being constructed to hold the clamp members against further advancing and closing movement during the overwiping movement of the wipers.

130. In a machine of the class described, end embracing wipers mounted for preliminary advancing and closing movements relatively to a shoe, means for holding the wipers against retractive movement from the position thus determined for operation upon a plurality of shoes, a device for clamping the margin of the upper on the wipers, said device being mounted for advancing movement with the wipers in the positioning movement of the wipers, and means automatically operative to position said clamping device in the initial relation to the wipers thus determined for operation upon a plurality of shoes.

131. In a machine of the class described, the combination with end embracing wipers and operating means for said wipers, of a manually operated member for moving parts of said wiper operating means relatively to effect a preliminary advancing and closing movement of the wipers round the end of a shoe, a device for clamping the margin of the upper on the wipers, a support for said clamping device mounted for movement lengthwise of the shoe, and connections between said manually operated member and support for moving the clamping device preliminarily with the wipers.

132. In a machine of the class described, the combination with end embracing wipers, of a device for clamping the margin of an upper on said wipers, a support on which said clamping device is mounted and relatively to which it is movable in directions transverse to the plane of the wipers, means for moving said support in a direction to carry said device into clamping relation to the wipers, a lever pivoted on said support and connected to the clamping device, and a spring connection between said support and lever to hold said device yieldingly in clamping position.

133. In a machine of the class described, the combination with end embracing wipers, of a device for clamping the margin of an upper on said wipers, a support on which said clamping device is mounted and relatively to which it is movable in directions transverse to the plane of the wipers, means for moving said support in a direction to carry said device into clamping relation to the wipers, a spring connection between said device and support for holding the device yieldingly in clamping position, and a stop for determining the initial position of the device relatively to its support.

134. In a machine of the class described the combination with end embracing wipers, of a device for clamping the margin of an upper on said wipers, and means for moving said device outwardly over the wipers to spread the upper and for subsequently depressing the shoe to stretch the clamped upper.

135. In a machine of the class described, the combination with end embracing wipers, of a device for clamping the margin of an upper on said wipers, a holder for said device relatively to which the latter is movable lengthwise of the shoe, said holder being movable in a direction transverse to the plane of the wipers to carry the device into clamping position, and a guide connected to said device to determine its position lengthwise of the shoe during said movement of the holder.

136. In a machine of the class described, the combination with end embracing wipers, of a device for clamping the margin of an upper on said wipers, a holder for said device relatively to which the latter is movable along the plane of the wipers, said holder being movable in a direction transverse to the plane of the wipers to carry the device into clamping position, and means operated by said movement of the holder to move said device outwardly over the wipers to spread the margin of the upper.

137. In a machine of the class described, the combination with end embracing wipers, of a device for clamping the margin of an upper on said wipers, a holder on which said device is supported for movement lengthwise of the shoe, said holder being movable in a direction transverse to the plane of the wipers to carry the device into clamping position, and a guide connected to said device to determine its position lengthwise of the shoe during said movement of the holder, said guide having an offset portion to move the device outwardly over the wipers to spread the margin of the upper.

138. In a machine of the class described, the combination with end embracing wipers, of a pair of clamp members for clamping the margin of an upper on said wipers, a holder movable in a direction transverse to the plane of the wipers to carry said members into clamping position, said members being mounted for bodily movement relatively to said holder in directions lengthwise of the shoe and also for swinging movement laterally of the shoe, guiding means for imparting swinging movement to said members in their movement lengthwise of the shoe, and additional guiding means connected to said members to move them lengthwise of the shoe during said movement of the holder.

139. In a machine of the class described, the combination with end embracing wipers, of a device for clamping the margin of an upper on said wipers, a holder for said device movable to carry it into clamping position and then by continued movement to cause it to press the margin of the upper on the wipers, and a guide connected to said device to move it outwardly over the wipers to spread the margin of the upper as said holder continues to move after the device has been carried into clamping position.

140. In a machine of the class described, the combination with end embracing wipers and power means connected to said wipers to operate them, of additional manually operated means for closing said wipers preliminarily into conformity to the contour of a shoe, a device for clamping the margin of the upper on said wipers, said device being mounted for movement along the plane of the wipers and also in a direction transverse to said plane, and connections between said device and the manually operated wiper closing means for imparting positioning movement to the device with the wipers, said connections including a guide automatically operative to impart to the clamping device an outward movement over the wipers to spread the upper after the device has been carried to clamping position.

141. In a machine of the class described, the combination with end embracing wipers and means for operating them to wipe the margin of an upper inwardly, of a device for clamping the margin of the upper on said wipers, and means automatically operative in time relation to the movement of the wipers to relieve the clamping pressure of said device on the upper before the wipers have completed their operative movement.

142. In a machine of the class described, the combination with end embracing wipers and means for operating them to wipe the margin of an upper inwardly over the bottom of a last, of a device for clamping the margin of the upper on said wipers, and power operated means timed to relieve the clamping pressure of said device on the upper after the wipers have advanced over the edge of the shoe bottom and before they have completed their operative movement.

143. In a machine of the class described, the combination with end embracing wipers, of power driving means, connections between said driving means and the wipers to close them inwardly, a device for clamping the margin of the upper on said wipers, and connections between said driving means and clamping device for operating said device to release the margin of the upper before the wipers have completed their operative movement.

144. In a machine of the class described, the combination with end embracing wipers and power driving means for operating said wipers to wipe the margin of an upper inwardly over the bottom of a last, of a device for clamping the margin of the upper on said wipers, and connections between said clamping device and the driving means for moving said device out of clamping position, said connections including a part adjustable to vary the time of such movement of the device.

145. In a machine of the class described, the combination with shoe positioning means and end embracing wipers, of power-operated means for effecting relative movement of said shoe positioning means and wipers to upwipe and to overwipe the margin of an upper and subsequently to relieve the pressure on the overwiped margin of the upper to afford space for a lasting binder, a device for clamping the margin of the upper on said wipers to assist in conforming and tightening the margin of the upper to the last, and connections between said power means and clamping device timed to relieve the clamping pressure of said device on the upper before the shoe positioning means and the wipers are moved relatively to relieve the pressure on the overwiped margin.

146. In a machine of the class described, the combination with a toe rest, of a holddown for engaging the insole of a shoe inside of the sewing rib, and automatice means for moving said holddown toward the end of the shoe while it is in engagement with the insole to force it into supporting relation to said rib.

147. In a machine of the class described, a holddown for engaging the insole of a shoe inside of the sewing rib, a support on which said holddown is mounted to yield in a direction transverse to the plane of the insole in response to pressure of the shoe, means for effecting relative movement of said support and the shoe in a direction transverse to the plane of the insole, and a device operative in response to such relative movement of the support and the shoe to move the holddown lengthwise of the shoe.

148. In a machine of the class described, the combination with a toe rest for a shoe, of a holddown for engaging the insole of the shoe inside of the sewing rim, a support on which said holddown is mounted to yield in a direction transverse to the plane of the insole in response to pressure of the shoe, said support being movable in a direction transverse to the plane of the insole to carry the holddown into engagement with the insole, and a guide connected to said support and operative in the continued movement of the support after the holddown has engaged the insole to move said support and holddown lengthwise of the shoe.

149. In a machine of the class described, the combination with shoe positioning means, of end embracing wipers, a holddown for engaging the sole of the shoe, a device for clamping the margin of the upper on the wipers, and means for moving said holddown and clamping device together lengthwise of the shoe.

150. In a machine of the class described, the combination with shoe positioning means, of end embracing wipers, a holddown for engaging the insole of the shoe, a device for clamping the margin of the upper on the wipers, a common support for said holddown and clamping device, and means for moving said support lengthwise of the shoe to carry the holddown into supporting relation to the rib of the insole and to cause the clamping device to spread the margin of the upper over the wipers.

151. In a machine of the class described, the combination with shoe positioning means, of end embracing wipers, a holddown for engaging the sole of the shoe, a device for clamping the margin of the upper on the wipers, a support for said holddown and clamping device, means for moving said support in a direction transverse to the plane of the insole to carry said holddown and clamping device into engagement with the work, and mechanism automatically operative in the continued movement of said support to impart a movement lengthwise of the shoe to said clamping device and holddown.

152. In a machine of the class described, the combination with shoe positioning means and end embracing wipers, of a holddown for engaging the sole of the shoe, a device for clamping the margin of the upper on the wipers, manual means for imparting to said holddown and clamping device a positioning movement lengthwise of the shoe prior to their engagement with the work, and power-operated means for moving said holddown and clamping device in the reverse direction after they have engaged the work.

153. In a machine of the class described, the combination with shoe positioning means and end embracing wipers, of a holddown for engaging the sole of the shoe, a device for clamping the margin of the upper on the wipers, manual means for imparting to said holddown and clamping device a positioning movement lengthwise of the shoe prior to their engagement with the work, power means for moving said holddown and clamping device in a direction transverse to the plane of the sole to carry them into engagement with the work, and a device automatically operative after said parts have engaged the work to move them in the reverse direction lengthwise of the shoe.

154. In a machine of the class described, the combination with shoe positioning means and end embracing wipers, of a holddown for engaging the sole of the shoe, a device for clamping the margin of the upper on the wipers, a support for said holddown and clamping device relatively to which said parts are permitted to yield upon engagement with the work, mechanism connected to said support to move it in a direction transverse to the plane of the sole, and a device automatically operative in the continued movement of said support after said holddown and clamping device have engaged the work to move said holddown and clamping device lengthwise of the shoe.

155. In a machine of the class described, the combination with shoe positioning means and end embracing wipers, of a holddown for engaging the sole of the shoe, a device for clamping the margin of the upper on the wipers, a support for said holddown and clamping device relatively to which said parts are permitted to yield upon engagement with the work, mechanism connected to said support to move it in a direction transverse to the plane of the sole, mechanism automatically operative in the continued movement of said support after the holddown and clamping device have engaged the work to move said parts lengthwise of the shoe, and a stop arranged to come into play to position the holddown positively in engagement with the work.

156. In a machine of the class described, the combination with end embracing wipers and means for operating said wipers, of additional means for imparting an initial positioning movement to the wipers, a holddown for engaging the sole of the shoe, a device for clamping the margin of the upper on the wipers, and connections between said additional means and the holddown and clamping device for imparting to said holddown and device a positioning movement with the wipers.

157. In a machine of the class described, the combination with end embracing wipers and means for operating said wipers, of additional means for imparting an initial positioning movement to the wipers, a holddown for engaging the sole of the shoe, a device for clamping the margin of the upper on the wipers, a common support for said holddown and clamping device, and a connection between said additional means and support for moving the holddown and clamping device lengthwise of the shoe with the wipers.

158. In a machine of the class described, the combination with end embracing wipers, of a holddown for engaging the sole of the shoe, a device for clamping the margin of the upper on the wipers, a support for said holddown and clamping device mounted for movement to cause the holddown to depress the shoe while the upper is clamped on the wipers, and a spring connection between said support and clamping device to cause said device to bear with increasing pressure on the upper as the shoe is depressed.

159. In a machine of the class described, the combination with end embracing wipers, of a holddown for engaging the sole of the shoe, a device for clamping the margin of the upper on the wipers, a support for said holddown and clamping device mounted for movement in a direction transverse to the plane of the shoe bottom, mechanism operated by said movement of the support to move the clamping device outwardly over the wipers to spread the upper, and additional mechanism operative in the continued movement of said support to cause the holddown to depress the shoe relatively to the wipers for stretching the clamped upper.

160. In a machine of the class described, the combination with end embracing wipers and means for operating said wipers to wipe an upper inwardly over the bottom of a last, of power operated means for moving the last to press the overwiped upper against the wipers and for subsequently moving it reversely to relieve said pressure, and means automatically operative to force a binder in between the wipers and the shoe after the pressure has been thus relieved.

161. In a machine of the class described, a pair of end embracing wipers, a device for clamping the margin of an upper on the wipers, a holddown, a toe rest, power-driven mechanism for moving said parts relatively to upwipe and to overwipe an upper round the end of a last, and mechanism automatically operative subsequently to apply a binder round the end of the shoe and to fasten it to the shoe.

162. In a machine of the class described, a pair of end embracing wipers, means for positioning a shoe relatively to said wipers, power-driven mechanism for effecting relative movement of said shoe positioning means and wipers to upwipe and to overwipe an upper, a device mounted for movement round the end of the shoe to apply a binder to the shoe, devices for fastening the binder at the opposite sides of the shoe, and additional power-driven mechanism for operating said binder applying and fastening devices.

163. In a machine of the class described, the combination with end embracing wipers, wiper carriers, and means for operating said wiper carriers to impart advancing and closing movements to the wipers, of members for clamping the margin of the upper on the wipers, and mechanism connected to the wiper operating means independently of the wiper carriers for advancing and closing the clamping members with the wipers.

164. In a machine of the class described, the combination with end embracing wipers, and operating means for imparting advancing movement to said wipers and for guiding them to swing toward each other during such movement, of members for clamping the margin of the upper on the wipers, and means for moving said clamping members with the wipers including additional guiding means to cause said members to swing with the wipers.

165. In a machine of the class described, the combination with end embracing wipers, and operating means for said wipers including mechanism for closing them preliminarily about a toe to adjust them to the size and style of shoe on which the machine is to be used, of members for clamping the margin of the upper on the wipers, and controlling means for said clamping members to close them inwardly with the wipers in the preliminary adjustment of the wipers to the shoe and thereafter to hold them from further closing movement during the operation of the wipers.

166. In a machine of the class described, the combination with end embracing wipers, and operating means for advancing said wipers and for closing them about the toe of a shoe, of members for clamping the margin of the upper on the wipers, operating means for advancing said clamping members with the wipers and for thereafter imparting to them retracting movement relatively to the wipers to lay the margin of the upper over the wipers, and guiding means to cause said members to swing inwardly as they are advanced and outwardly as they are retracted.

167. In a machine of the class described, the combination with end embracing wipers, of a device for clamping an upper on said wipers, and controlling means automatically operative to relax the clamping pressure of said device on the upper at an intermediate stage in the operation of the wipers.

168. In a machine of the class described, the combination with end embracing wipers for wiping an upper inwardly over a form, of a device for clamping an upper on said wipers, means for effecting relative movement of said form and wipers to stretch the upper over the form, and controlling means automatically operative thereafter to relax the clamping pressure of said device on the upper before the overwiping operation is completed.

169. In a machine of the class described the combination with means for wiping the toe of an upper heightwise of a last and inwardly over the bottom of the last, of binder applying and fastening means automatically operative in time relation to said wiping means to apply a binder about the toe and to fasten the binder at the opposite sides of the shoe.

170. In a machine of the class described, the combination with toe embracing wipers, of power operated means for effecting in time relation to each other relative movement of said wipers and a last heightwise of the last to upwipe an upper and movement of the wipers to wipe the upper inwardly over the bottom of the last, and power operated means for thereafter fastening a toe binder to the shoe at the opposite sides of the shoe.

171. In a machine of the class described, the combination with toe embracing wipers, of means for clamping an upper on the wipers and for effecting relative movement between said wipers and clamping means and a last to upwipe the upper about the toe of the last, means for operating the wipers to wipe the upper inwardly over the bottom of the last, and mechanism automatically operative thereafter to apply a binder about the toe and to fasten the binder at the opposite sides of the shoe.

172. A machine of the class described having, in combination, means for wiping an upper into lasted position about the toe of a last, means for thereafter applying a binder about the toe and for fastening it to the shoe, and power driven mechanism for imparting operative movements to said wiping means and said binder applying and fastening means in time relation to each other in a continuous operation of the machine.

In testimony whereof I, the said ELI BROTHERS, have signed my name to this specification.

ELI BROTHERS.

In testimony whereof I, the said WILLIAM E. SCARLETT, have signed my name to this specification.

WILLIAM E. SCARLETT.